United States Patent
Dan

(10) Patent No.: US 11,254,008 B2
(45) Date of Patent: Feb. 22, 2022

(54) METHOD AND DEVICE OF CONTROLLING ROBOT SYSTEM

(71) Applicant: CANON KABUSHIKI KAISHA, Tokyo (JP)

(72) Inventor: Keita Dan, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 119 days.

(21) Appl. No.: 16/460,298

(22) Filed: Jul. 2, 2019

(65) Prior Publication Data

US 2020/0023521 A1    Jan. 23, 2020

(30) Foreign Application Priority Data

Jul. 18, 2018 (JP) .............................. JP2018-135334

(51) Int. Cl.
*B25J 9/16* (2006.01)

(52) U.S. Cl.
CPC ........... *B25J 9/1697* (2013.01); *B25J 9/1692* (2013.01)

(58) Field of Classification Search
CPC .............. B25J 9/1692; B25J 9/1697; G05B 2219/39011; G05B 2219/39013; G05B 2219/39016; G05B 2219/39022; G05B 2219/39038; G05B 2219/39391; G05B 2219/40591; G05B 2219/40604; G05B 2219/40605; G05B 2219/40607; G05B 2219/40609; G05B 2219/40423; G05B 2219/40425

See application file for complete search history.

(56) References Cited

U.S. PATENT DOCUMENTS

| | | | | |
|---|---|---|---|---|
| 9,278,454 B2* | 3/2016 | Mimura | ................ | B25J 13/006 |
| 2002/0148275 A1* | 10/2002 | Abbe | .................. | G01B 21/042 |
| | | | | 73/1.01 |
| 2008/0188983 A1* | 8/2008 | Ban | ..................... | G01B 21/042 |
| | | | | 700/245 |
| 2011/0157373 A1 | 6/2011 | Ye | | |
| 2016/0059419 A1* | 3/2016 | Suzuki | .................. | B25J 9/1697 |
| | | | | 700/114 |
| 2016/0288324 A1* | 10/2016 | Bradski | .................. | G06T 7/529 |
| 2017/0066133 A1* | 3/2017 | Ooba | ..................... | B25J 9/1697 |
| 2018/0222049 A1 | 8/2018 | Suzuki | | |
| 2018/0222056 A1 | 8/2018 | Suzuki | | |
| 2018/0297198 A1 | 10/2018 | Dan | | |

FOREIGN PATENT DOCUMENTS

| | | |
|---|---|---|
| JP | 2015-112654 | 6/2015 |
| JP | 2016-1181 | 1/2016 |
| JP | 2016-52695 | 4/2016 |
| JP | 2016-78195 | 5/2016 |

* cited by examiner

*Primary Examiner* — Khoi H Tran
*Assistant Examiner* — Nhi Q Bui
(74) *Attorney, Agent, or Firm* — Venable LLP

(57) ABSTRACT

A method of controlling a robot system includes measuring, capturing, and calculating. A measuring device attached to the robot measures a position and an orientation of a marker with respect to the robot. An imaging device captures an image of the marker and a workpiece. A control device calculates a relative positional relationship between the workpiece and the robot in accordance with a result obtained by the measuring device and with the image captured by the imaging device.

19 Claims, 15 Drawing Sheets

METHOD AND DEVICE OF CONTROLLING ROBOT SYSTEM

BACKGROUND OF THE INVENTION

Field of the Invention

The present invention relates to a method and a device of controlling a robot system including a controller that controls the position and the orientation of a workpiece-handling robot depending on an image captured by an imaging device.

Description of the Related Art

In recent years, assembling apparatuses that cause robots to perform assembly work have been widely used. For allowing such robots to pick a workpiece or perform assembly work with high accuracy, there is a known system in which a robot is combined with a vision sensor for correcting the position and the orientation of the robot. The vision sensor can measure the position and the orientation of a target object from a captured image of the target object. The vision sensor may be a monocular camera which two-dimensionally measures the position and the orientation of a target object, or may be a stereo camera which three-dimensionally measures the position and the orientation of a target object. Commonly, the vision sensor used for robots may be referred to as a vision, a robot vision, or a camera.

For example, in a robot vision system for a workpiece-picking robot, a vision sensor is installed above a workpiece supply area to capture an image of the whole of the workpiece supply area. Here, a stand to install the vision sensor is called a camera stand. Typically, since a plurality of workpieces is supplied, arranged in a tray or a parts box, the workpiece supply area is large. Thus, for allowing the vision sensor to capture an image of the large workpiece supply area, the distance (working distance) between the workpieces and the vision sensor is long.

In the picking operation, the vision sensor measures the position and the orientation of the workpiece. Then, by using the measured position and orientation of the workpiece, the position and the orientation of a robot hand attached to the leading end of a robot arm is corrected for allowing the robot hand to pick the workpiece. In such a robot vision system, the relationship between a robot coordinate system and a vision-sensor coordinate system is calibrated in advance. This calibration is performed to transform a measurement value obtained in the vision-sensor coordinate system, into a measurement value in the robot coordinate system in which the robot arm is controlled. Here, calibrating the relationship between the robot coordinate system and the vision-sensor coordinate system, that is, obtaining calibration data used to perform the coordinate transformation between the two coordinate systems may be referred to as hand eye calibration.

Here, the definition of the vision-sensor coordinate system will be described.

When the vision sensor is an imaging device such as a camera, internal and external parameters of the camera are calibrated in advance. The internal parameters represent optical properties of lenses, such as a focal length and distortion property. When a monocular camera is used, the external parameters of the monocular camera represent the position and the orientation of the camera. On the other hand, when a stereo camera is used, the external parameters of the stereo camera represent a relative position and orientation between two cameras.

The vision-sensor coordinate system can be defined by using the internal and external parameters, and calculating the internal and external parameters is called camera calibration.

In the robot vision system, however, since a supporting portion for the imaging device, such as a camera stand, vibrates or deforms, the position of the vision sensor may change. The change in position of the vision sensor changes the calibrated relationship between the robot coordinate system and the vision-sensor coordinate system, causing an error in the calibration data used for correcting the position and the orientation of the robot hand. As a result, the robot may unsuccessfully pick the workpiece.

As one of countermeasures against the change in position of the vision sensor caused by the vibration or deformation of the camera stand, there might be a solution in which the stiffness of the camera stand is increased. However, if the stiffness is increased by changing the structure of the camera stand, for example, by making a pillar of the camera stand thicker, the hardware may upsize and the cost may increase. That is, the countermeasure by changing the hardware, such as increasing the stiffness of the camera stand, may upsize the manufacturing apparatus and increase cost.

Japanese Patent Application Publication No. 2016-1181 proposes another method. This method compares an expected image, obtained in advance, with an actually captured image; and determines whether the internal and external parameters of the camera change from those obtained through the calibration. In this method, when the internal and external parameters change, a process to recalibrate the parameters will be performed.

Thus, the technique of Japanese Patent Application Publication No. 2016-1181 recalibrates the vision sensor at a timing when the recalibration becomes necessary. However, when the technique of Japanese Patent Application Publication No. 2016-1181 is performed in an environment where the supporting portion for the imaging device easily vibrates or deforms as described above, the determination for the recalibration may be frequently made. Here, in the recalibration of the internal and external parameters as intended in Japanese Patent Application Publication No. 2016-1181, a calibration plate on which a large number of markers are formed is used, and images of the calibration plate are captured, with a variety of orientations of the calibration plate. However, such recalibration is generally troublesome. Specifically, if the determination for the recalibration is frequently made, the practicality of the system may be impaired.

An object of the present invention is to control the position and the orientation of the robot hand, with high accuracy and high speed, in a simple and inexpensive configuration, even in an environment where disturbance, such as vibration or deformation of the supporting portion for the imaging device, may occur.

SUMMARY OF THE INVENTION

According to a first aspect of the present invention, a method of controlling a robot system including a control device, the control device controlling a robot to handle a workpiece, in accordance with an image captured by an imaging device, the method includes measuring, by a measuring device attached to the robot, a position and an orientation of a marker with respect to the robot, the position and the orientation of the marker with respect to the robot being fixed, capturing, by the imaging device, an image of the marker and the workpiece, and calculating, by the control device, a relative positional relationship between the workpiece and the robot in accordance with a result obtained by the measuring device and with the image captured by the imaging device.

According to a second aspect of the present invention, a control device controls a robot system in accordance with an image captured by an imaging device. The robot system is configured to control a robot to handle a workpiece, and includes marker. Position of the marker with respect to the robot is fixed. The imaging device is configured to capture an image of the marker and the workpiece. A measuring device is attached to the robot to measure position and orientation of the marker with respect to the robot. The control device is configured to calculate a relative positional relationship between the workpiece and the robot in accordance with the image of the marker and the workpiece captured by the imaging device and a measurement result by the measuring device.

According to a third aspect of the present invention, a robot is controlled in accordance with an image captured by an imaging device. The robot is configured to handle a workpiece and includes a marker. A position of the marker with respect to the robot is fixed. The image captured by the imaging device is an image of the marker and the workpiece.

Further features of the present invention will become apparent from the following description of exemplary embodiments with reference to the attached drawings.

DESCRIPTION OF THE EMBODIMENTS

Hereinafter, some embodiments of the present invention will be described with reference to the accompanying drawings. Here, since configurations described below are merely examples, detailed configurations thereof may be modified as appropriate by a person skilled in the art without departing from the spirit of the present invention. In addition, since numerical values of the embodiments are merely examples, they are not intended to limit the present invention.

First Embodiment

First, mathematical expressions used herein will be described. A symbol T represents a homogeneous coordinate-transformation matrix to transform a coordinate system represented by an upper left index, to a coordinate system represented by a lower right index. For example, a homogeneous coordinate-transformation matrix $^{A}T_{B}$ is expressed as below by using a rotation matrix (three degrees of freedom) and a translation matrix (three degrees of freedom).

$$^{A}T_{B} = \begin{pmatrix} & ^{A}R_{B} & & ^{A}t_{B} \\ 0 & 0 & 0 & 1 \end{pmatrix}$$

In addition, a symbol p represents a homogeneous vector for a coordinate value of a point P that is obtained in a coordinate system represented by an upper left index. For example, when the coordinate value of the point P is expressed as P(X, Y, Z), the homogeneous vector $^{A}p$ is expressed as below.

$$^{A}p = \begin{pmatrix} X \\ Y \\ Z \\ 1 \end{pmatrix}$$

Figure 1:
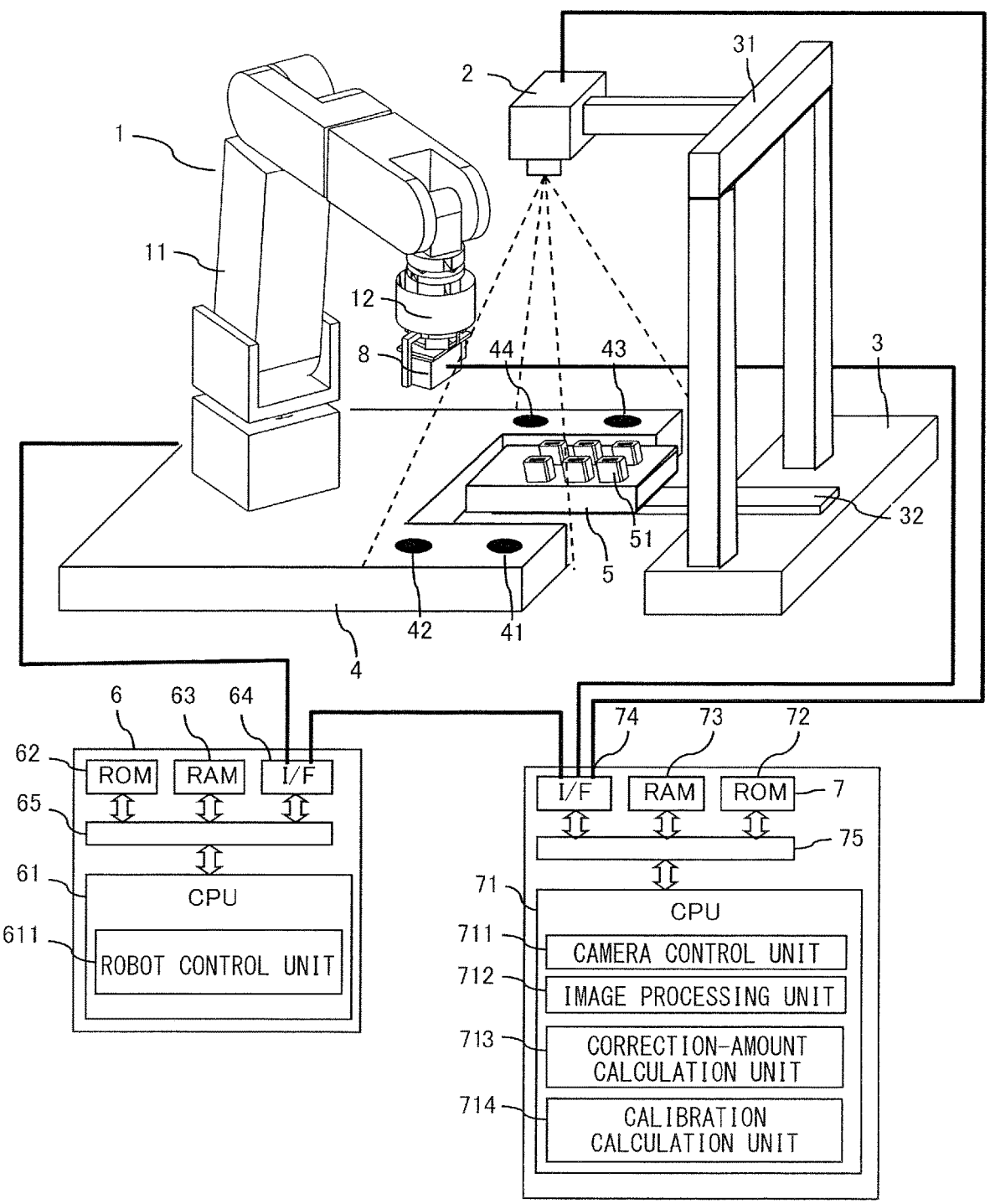
FIG. 1 is a diagram illustrating a configuration of a robot system of first to third embodiments of the present invention.

Next, one example of a configuration of a robot system of the present invention will be described. FIG. 1 illustrates one example of an overall configuration of the robot system of the present embodiment. The robot system causes a robot 1 to pick a workpiece 51. In this time, the robot system causes a fixed camera 2, serving as an imaging device, to capture an image of the workpiece 51; causes an image processing device 7 to measure the position and the orientation of the workpiece 51; and corrects the position and the orientation of the robot 1 by using the measured data.

The robot 1 is installed on a stand 4. The robot 1 includes a robot arm 11 that is an articulated robot arm, and a robot hand 12 that is an end effector attached to the robot arm 11. Here, although the robot arm 11 is a vertically articulated robot arm in FIG. 1, it may be another type of robot arm, such as a parallel-link robot arm or a prismatic-joint robot arm.

The robot arm 11 moves the robot hand 12 attached to the leading end of the robot arm 11, and causes the robot hand 12 to handle the workpiece 51. The robot hand 12 is a jig with a plurality of fingers. Although the robot hand 12 has two fingers in FIG. 1, the number of the fingers and detailed configuration of the fingers may be changed as appropriate. The robot 1 causes the robot hand 12 to pick the workpiece 51, move the workpiece 51, and attach the workpiece 51 to another workpiece.

The fixed camera 2 is disposed so as to capture an image of the workpiece 51 and reference markers 41 to 44, as a whole. In the present embodiment, the fixed camera 2 is a stereo camera that can perform three-dimensional measurement. However, the fixed camera 2 may be a monocular camera. Preferably, the fixed camera 2 has an internal image sensor with a global shutter, to suppress undesired vibration effect when capturing images.

In the present embodiment, the fixed camera 2 is supported by a camera stand 31, which is one portion of a stocker 3. The camera stand 31, which is a supporting portion to support the fixed camera 2 that serves as an imaging device, supports the fixed camera 2 so that the fixed camera 2 is positioned at a position at which the angle of view of the fixed camera 2, indicated by broken lines, covers the workpiece 51 and the reference markers 41 to 44. Thus, in the present embodiment, the camera stand 31 includes a U-shaped base unit and a supporting arm. The supporting arm extends substantially horizontally, from the base unit toward a position above the working area of the robot 1.

The stocker 3 has a conveyance function to convey a tray 5 on which the workpiece 51 is placed, into an area in which the robot 1 can handle the workpiece 51. The components of the robot system of FIG. 1 may be arranged in consideration of the conveyance function of the stocker 3, the operability of the robot 1, the angle of view of the fixed camera 2, and the like. In the present embodiment, a base unit of the stocker 3 is mechanically separated from the stand 4 of the robot arm 11 so that the vibration caused by the conveyance operation of the stocker 3 is transmitted, as less as possible, to the stand 4 of the robot arm 11.

However, the camera stand 31 may be placed on the stand 4 of the robot arm 11, or on a mount hung from a room ceiling. When the camera stand 31 is placed on the stand 4 of the robot arm 11, it is also preferable that the stocker 3, which may cause vibration, is mechanically separated from the stand 4.

In FIG. 1, the stocker 3 includes a slider 32 used to supply or eject the tray 5 on which the workpiece 51 is placed. In addition, on the stocker 3, the camera stand 31 is disposed as described above. In such a configuration, since the camera stand 31 is disposed on the base on which the movable slider 32 is disposed, the camera stand 31 easily vibrates, easily changing the position of the fixed camera 2. However, since the configuration of FIG. 1 utilizes the structure of the stocker 3 and space above the stocker 3 for forming the camera stand 31, it has advantages that can save space and reduce the cost of the robot system.

In the present embodiment, even with the simple, inexpensive, and space-saving structure that may cause the fixed camera 2 to vibrate and change its position, the position and the orientation of the workpiece can be detected with high accuracy, and thereby the robot can be controlled with high accuracy.

On the stand 4, the reference markers 41 to 44 are formed. Images of the reference markers 41 to 44 can be captured by the hand camera 8 and the fixed camera 2, which are three-dimensional measuring devices. Here, the positional relationship between the robot 1 (e.g. base portion of the robot 1) and the reference markers 41 to 44 is fixed. For example, the reference markers 41 to 44 are formed on the stand 4 on which the robot 1 is installed, as illustrated in FIG. 1. In another configuration in which the positional relationship between the robot 1 and the reference markers 41 to 44 is fixed, the reference markers 41 to 44 may be formed on a jig that is placed on a room floor. In this case, the stand 4 will be fixed to the room floor via some fixing part. In the configuration of the present embodiment, it is necessary that the positional relationship between the robot 1 and the reference markers 41 to 44 is fixed, or at least hardly changed.

The reference markers 41 to 44 of the present embodiment may be any markers as long as the position and the orientation of the markers with respect to the later-described three-dimensional measuring device (e.g. later-described hand camera 8) can be measured by the three-dimensional measuring device. For example, if the stand 4 has three or more feature portions whose positions and orientations can be measured with high accuracy by the fixed camera 2, the feature portions may be used instead of the reference markers 41 to 44. For example, such feature portions may be tapped holes formed in an upper surface of the stand 4.

In addition, although four reference markers 41 to 44 are formed in FIG. 1, at least three reference markers have only to be formed for three-dimensionally measuring the reference markers. When many (three or more) reference markers are formed, measurement error can be preferably reduced because measurement results can be averaged.

Figure 2:
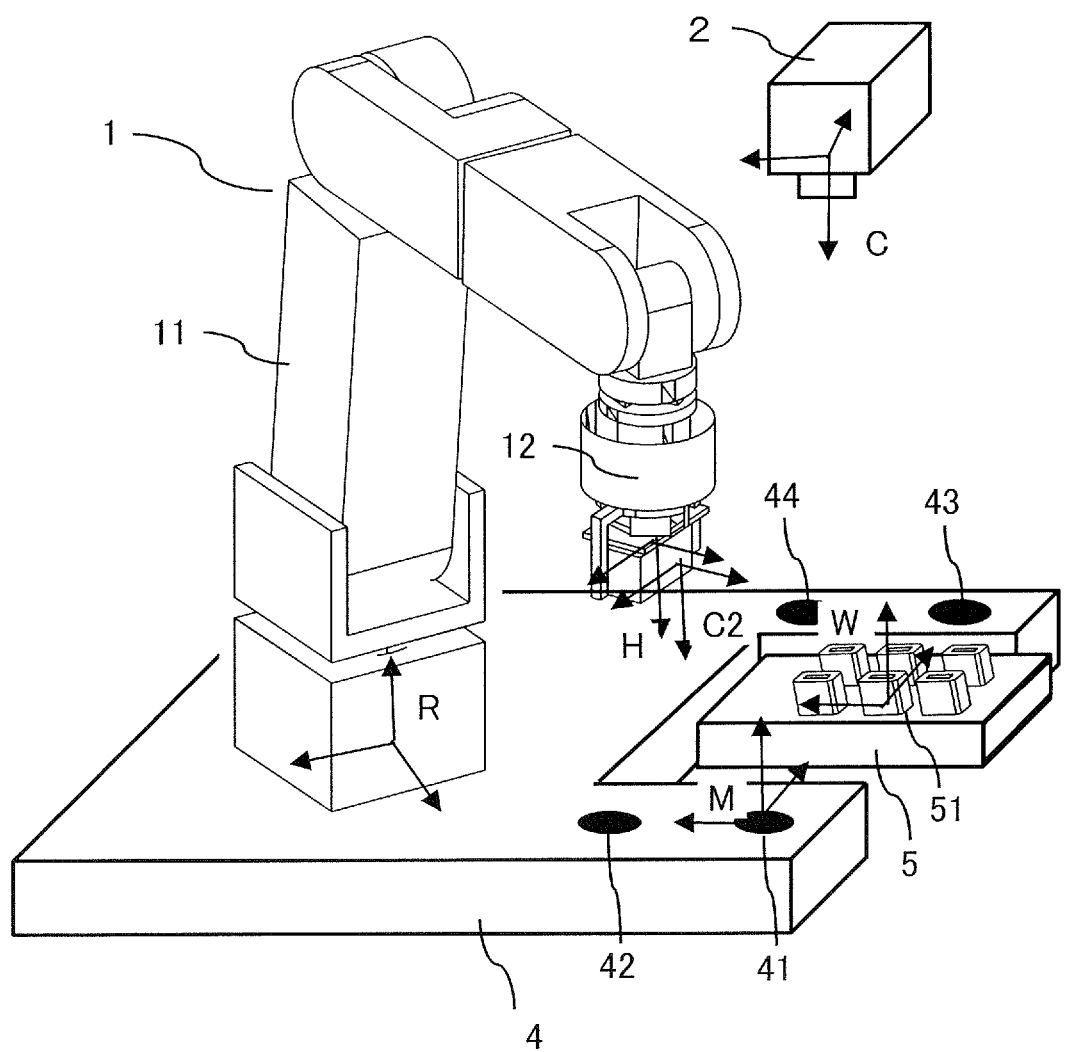
FIG. 2 is a diagram illustrating coordinate systems for the robot system of FIG. 1.

FIG. 2 illustrates coordinate systems used for the robot system of FIG. 1. As illustrated in FIG. 2, a marker coordinate system M is determined with reference to the reference markers 41 to 44. For example, the reference marker 41 serves as the origin, a vector from the reference marker 41 to the reference marker 42 corresponds to an X axis, a normal vector orthogonal to an approximate plane including the reference markers 41 to 44 corresponds to a Z axis, and a Y axis is orthogonal to the X axis and the Z axis. Thus, for accurately defining the marker coordinate system M, it is necessary that the relative position and orientation between the reference markers 41 to 44 are ensured with high accuracy by a mechanical means (for example, by fixing the reference markers 41 to 44 on the rigid stand 4).

In FIG. 1, the workpiece supply area surrounded by the reference markers 41 to 44 is a rectangular cutout of the stand 4. In FIG. 1, the tray 5 on which a plurality of workpieces 51 (to be measured by the fixed camera 2) is placed is placed in the workpiece supply area via the slider 32.

For example, when the robot hand 12 tries to hold the workpiece 51 on the tray 5, the position of the workpiece 51 may change in the tray 5, or the position of the tray 5 itself may change. For this reason, the position and the orientation of the robot arm 11 is required to be corrected by measuring the position of the workpiece 51 by using the fixed camera 2. As illustrated by the broken lines, the measurement area of the fixed camera 2 is within a range in which the robot arm 11 can move. As illustrated in FIG. 2, the position and the orientation of the workpiece 51 is indicated in a workpiece coordinate system W.

In FIG. 1, the robot 1 is controlled by a robot control device 6. The robot control device 6 includes a CPU 61 that performs computation, a memory unit including a ROM 62 and a RAM 63, and an interface (I/F) unit 64 that communicates with external units. These components are connected with each other via a bus 65, which is used for communication in the robot control device 6.

The robot 1 of FIG. 1 includes a robot control unit 611, which controls the CPU 61. Although the robot control unit 611 is illustrated as a hardware block in FIG. 1, the robot control unit 611 is achieved by the CPU 61 reading a program, stored in the ROM 62 for example, and executing the program.

The robot 1 is connected to the interface unit 64 of the robot control device 6. The position and the orientation of the robot arm 11 is controlled, depending on a command value transmitted by the robot control unit 611 via the interface unit 64. As illustrated in FIG. 2, at the base end of the robot arm 11, a robot coordinate system R is set to represent the position and the orientation of the robot arm 11 with respect to the stand 4. For example, the robot control unit 611 controls the motion of the robot arm 11 and the robot hand 12, depending on the calculated position and the orientation of the robot arm 11 in the robot coordinate system R.

The ROM 62 is a memory used to store a program to be executed by the CPU 61, and is a computer-readable recording medium. The area in which the program for the CPU 61 is stored may be in a rewritable memory device, such as an EEPROM. The recording medium that stores the program for the CPU 61 may be an external memory (not illustrated), such as an HDD or SSD, or may be a computer-readable replaceable recording medium, such as one of various optical disks or a flash memory.

The interface unit 64 may be connected with a teaching pendant (TP) (not illustrated), which is an operating device used to teach a motion to the robot 1. Typically, the operating device such as the teaching pendant includes various function keys and a display, and can operate the robot 1 through manual operation. In addition, the interface unit 64 may be connected with a user-interface device including a display (not illustrated), such as an LCD panel, and a keyboard. The user-interface device can be used to edit a robot program.

Figure 3A:
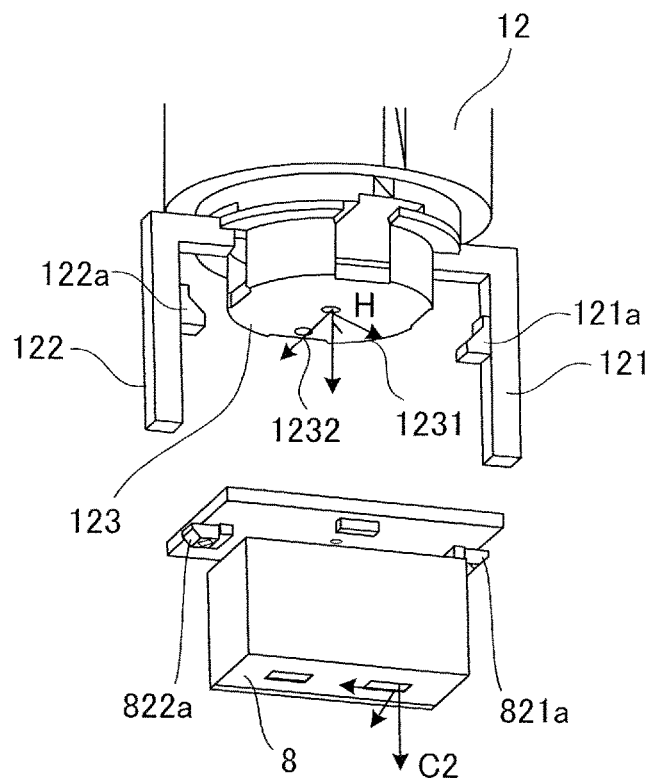
FIG. 3A is a diagram illustrating a hand camera separated from a robot hand.
Figure 3B:
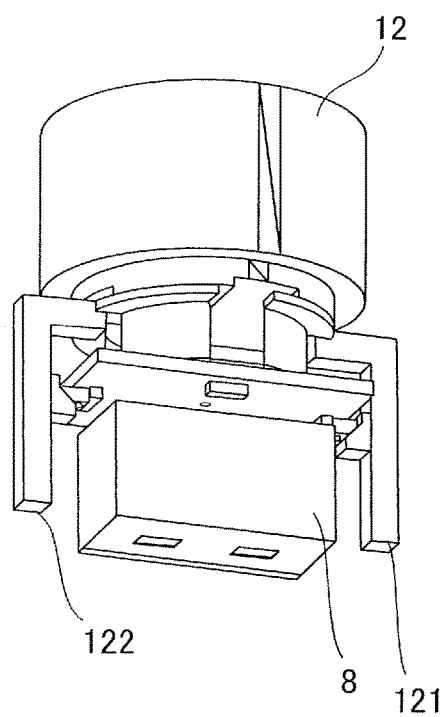
FIG. 3B is a diagram illustrating the hand camera attached to the robot hand.

FIGS. 3A and 3B illustrate enlarged views of the robot hand 12. FIG. 3A illustrates the robot hand 12 in a state where the robot hand 12 still does not hold the hand camera 8. FIG. 3B illustrates the robot hand 12 in a state where the robot hand 12 is holding the hand camera 8. The robot hand 12 has a mechanism to pick the workpiece 51, and attaching and detaching mechanisms, 1231 and 1232, for positioning and attaching the hand camera 8 and for releasing the hand camera 8. Since the robot hand 12 is also connected to the interface unit 64 of the robot control device 6, the robot control device 6 can control opening and closing of fingers 121 and 122 of the robot hand 12.

The hand camera 8 is a three-dimensional measuring device to three-dimensionally measure the reference markers 41 to 44. Thus, the hand camera 8 is a three-dimensional camera, such as a binocular stereo camera. Alternatively, the hand camera 8 may be an active stereo to three-dimensionally measure the reference markers 41 to 44, or a time-of-flight (ToF) camera. Here, although the hand camera 8 is a three-dimensional device to three-dimensionally measure the reference markers 41 to 44, the three-dimensional measurement may be performed not by the image measuring method, but by an another three-dimensional measuring method, as described in a later-described embodiment. As illustrated in FIGS. 2 to 3B, a camera coordinate system of the hand camera 8 is a hand camera coordinate system C2.

In the present embodiment, the three-dimensional measurement of the reference markers 41 to 44 by the hand camera 8 is performed to obtain calibration data between the robot coordinate system R and the marker coordinate system M. The hand camera 8 is used only in the calibration between the robot coordinate system R and the marker coordinate system M, and is not used in the normal operation of the robot 1. If the hand camera 8 is always attached to the robot arm 11, the hand camera 8 will disadvantageously decrease the area in which the robot arm 11 can move. Thus, since the hand camera 8 is preferably detachably attached to the robot hand 12, the hand camera 8 is structured so as to be held by the robot hand 12 in the present embodiment.

Preferably, the robot hand 12 has a mechanism that allows the hand camera 8 to be repeatedly and accurately attached to the robot hand 12. For example, in FIGS. 3A and 3B, pin holes 1231 and 1232 are formed in a palm unit 123 of the robot hand 12 for positioning. In addition, a guide hook 121a with a tapered portion is formed on the finger 121, and a guide hook 122a with a tapered portion is formed on the finger 122. When the fingers 121 and 122 hold the hand camera 8, the guide hooks 121a and 122a engage with guide hooks 821a and 822a of the hand camera 8, and urge the guide hooks 821a and 822a so that the base unit of the hand camera 8 is pushed toward the pin holes 1231 and 1232. At the palm unit 123 of the robot hand 12, a hand coordinate system H is set to indicate the position and the orientation of the robot hand 12.

The robot arm 11 drives the joints of the robot arm 11, depending on a command value outputted from the robot control unit 611 of the robot control device 6. With this operation, the robot arm 11 can control the position and the orientation of the robot hand 12. Specifically, the robot arm 11 can control the position and the orientation of the hand coordinate system H in the robot coordinate system R. In this case, the robot control unit 611 performs calculation based on inverse kinematics, and calculates target angle values of the joints of the robot arm 11 for achieving target values of the position and the orientation of the hand coordinate system H with respect to the robot coordinate system R. In this manner, the target values of the position and the orientation of the hand coordinate system H are determined, and accordingly the robot arm 11 is moved so that the robot hand 12 takes the target position and orientation.

When the robot arm 11 is moved, the robot control unit 611 performs servo-control so that current angle values outputted from encoders of the joints of the robot arm 11 become equal to the target angle values. Here, after obtaining the current angle values of the joints outputted from the encoders, the robot control unit 611 can calculate current position and orientation of the hand coordinate system H with respect to the robot coordinate system R.

On the other hand, an image processing device 7 illustrated in FIG. 1 causes the fixed camera 2 and the hand camera 8 to capture images, and processes the captured images. Like the robot control device 6, the image processing device 7 includes a CPU 71 as a main component. The image processing device 7 includes the CPU 71 that performs computation, a memory unit including a ROM 72 and a RAM 73, and an interface (I/F) unit 74 that communicates with external units. These components are connected with each other via a bus 75, which is used for communication in the image processing device 7. Like the robot control device 6, function blocks 711 to 714 are achieved by the CPU 71 executing a control program.

The fixed camera 2 and the hand camera 8 are connected with the image processing device 7 via the interface unit 74. The fixed camera 2 and the hand camera 8 capture images of the workpiece supply area and the reference markers 41 to 44, depending on commands from a camera control unit 711; and send the captured image data to the image processing device 7. In addition, the camera control unit 711 has a function to illuminate the workpiece 51 and the reference markers 41 to 44, as necessary, and a function to adjust the brightness of the light.

The image processing device 7 receives the image data, and causes the camera control unit 711 (or an image processing unit 712) to process the image data. The camera control unit 711 processes the image data, and calculates the position and the orientation of the workpiece 51 and the reference markers 41 to 44 from the image data. Here, a method of calculating the position of the reference markers 41 to 44 from an image captured by the fixed camera 2 will be described as an example.

In the present embodiment, the reference markers 41 to 44 are black and circular, and formed on a white surface of the stand 4. Hereinafter, the description will be made for a case where center positions of the black reference markers 41 to 44 are measured.

The camera control unit 711 extracts edges of images captured by two cameras of the fixed camera 2. Specifically, the camera control unit 711 uses the length and the circularity of the edges to extract the edges of the reference markers 41 to 44. Then the camera control unit 711 performs ellipse approximation on the extracted edges to determine the coordinate values of the center points of the ellipses. The camera control unit 711 then uses parallax calculated from the coordinate values of the center points of the ellipses, and the internal and external parameters obtained through the calibration of the fixed camera 2; and performs stereo measurement to determine the center positions of the reference markers 41 to 44 in the fixed-camera coordinate system C. Here, a symbol i is used as an identification number of one of the reference markers (i=1 to 4 in the present embodiment). A method to determine the internal and external parameters will be described later.

A correction-amount calculation unit 713 of the image processing device 7 calculates control command values (described later) for the robot arm 11, by using position data of the workpiece 51 and the reference markers 41 to 44 measured by the camera control unit 711 and the calibration data used to perform the coordinate transformation between the robot coordinate system R and the marker coordinate system M. The calibration data between the robot coordinate system R and the marker coordinate system M is calculated by a calibration calculation unit 714, and stored in the ROM 72 or the RAM 73. The calculated control command values are transmitted to the interface unit 64 of the robot control device 6 via the interface unit 74 of the image processing device 7, and then transmitted from the robot control device 6 to the robot arm 11.

The calibration calculation unit 714 has a function to calculate the internal and external parameters of the fixed camera 2 and the hand camera 8, and a function to calculate the calibration data between the reference markers and the robot arm. A method to calculate the calibration data between the reference markers and the robot arm will be described later. Here, a method to calculate the internal and external parameters of the fixed camera 2 and the hand camera 8 will be described. The description will be made for a stereo camera used in the present embodiment. The internal and external parameters of the stereo camera are stored in a memory, such as the ROM 72 or the RAM 73, of the image processing device 7.

Here, the internal and external parameters of the fixed camera 2 and the hand camera 8 will be described with reference to FIG. 4. Although FIG. 4 illustrates the fixed camera 2 as an example, the hand camera 8 has the same configuration as that of the fixed camera 2.

Figure 4:
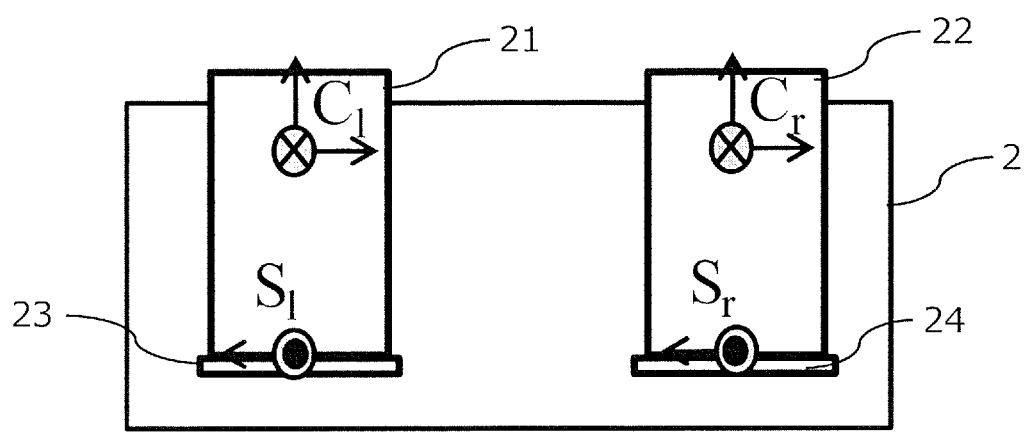
FIG. 4 is a diagram illustrating a configuration of a stereo camera that is one example of the hand camera.

FIG. 4 schematically illustrates an internal configuration of the fixed camera 2. The internal parameters are parameters on focal length, center of image, and lens distortion of monocular cameras 21 and 22 of the fixed camera 2, which is a stereo camera in this case. With the internal parameters, the relative position and orientation between sensor coordinate systems $S_l$ and $S_r$, which are respectively set on image sensors 23 and 24, and camera coordinate systems $C_l$ and $C_r$ are determined. Here, the indexes l and r indicate left and right optical systems that capture images.

On the other hand, the external parameters indicate the relative position and orientation between the monocular cameras 21 and 22. With the external parameters, the relative position and orientation between the camera coordinate system $C_l$ of the monocular camera 21 and the camera coordinate system $C_r$ of the monocular camera 22 are determined.

In general, when the internal and external parameters of the stereo camera 2 are calibrated, a plurality of images of an object used for the calibration is captured by the stereo camera 2, with the position and the orientation of the object being varied. The object is provided with an image pattern with predetermined size and shape. Then image processing is performed on the images captured by the monocular cameras 21 and 22, to determine the positions of feature points of the images of the object. In this time, epipolar constraint is applied in theory. In the epipolar constraint, an identical feature point exists on an identical plane (epipolar plane) of images captured by each of the monocular cameras. Thus, by performing an optimizing calculation so that the epipolar constraint is satisfied, the internal and external parameters can be calculated. When the internal and external parameters are calibrated, a calibration plate having a chess board pattern or a check pattern may be used as the object used for the calibration.

Next, with reference to FIGS. 5 and 8, a method of the present embodiment to control the position and the orientation of the robot 1 will be described. The control method illustrated in FIGS. 5 and 8 may be stored in the ROM 72, as a control program executed by the CPU 71.

Generally, the control method includes offline operations (S101 to S103) and online operations (S104 to S106). The offline operations S101 to S103 are basically performed only once. The offline operations S101 to S103 are preparatory steps performed by an operator. The online operations S104 to S106 are performed every time the workpiece 51 is supplied and the picking operation is performed.

In the offline operations (S101 to S103), the fixed camera 2 is calibrated (S101) to obtain the internal and external parameters of the fixed camera 2. The fixed camera 2 may be calibrated on a jig before installed on the camera stand 31, or may be calibrated on the camera stand 31.

Then the hand camera 8 is calibrated (S102). In this process, the internal and external parameters of the hand camera 8 are calculated, and the calibration between hand and camera is performed. Preferably, the hand camera 8 is calibrated on another device before attached to the robot hand 12.

Figure 6:
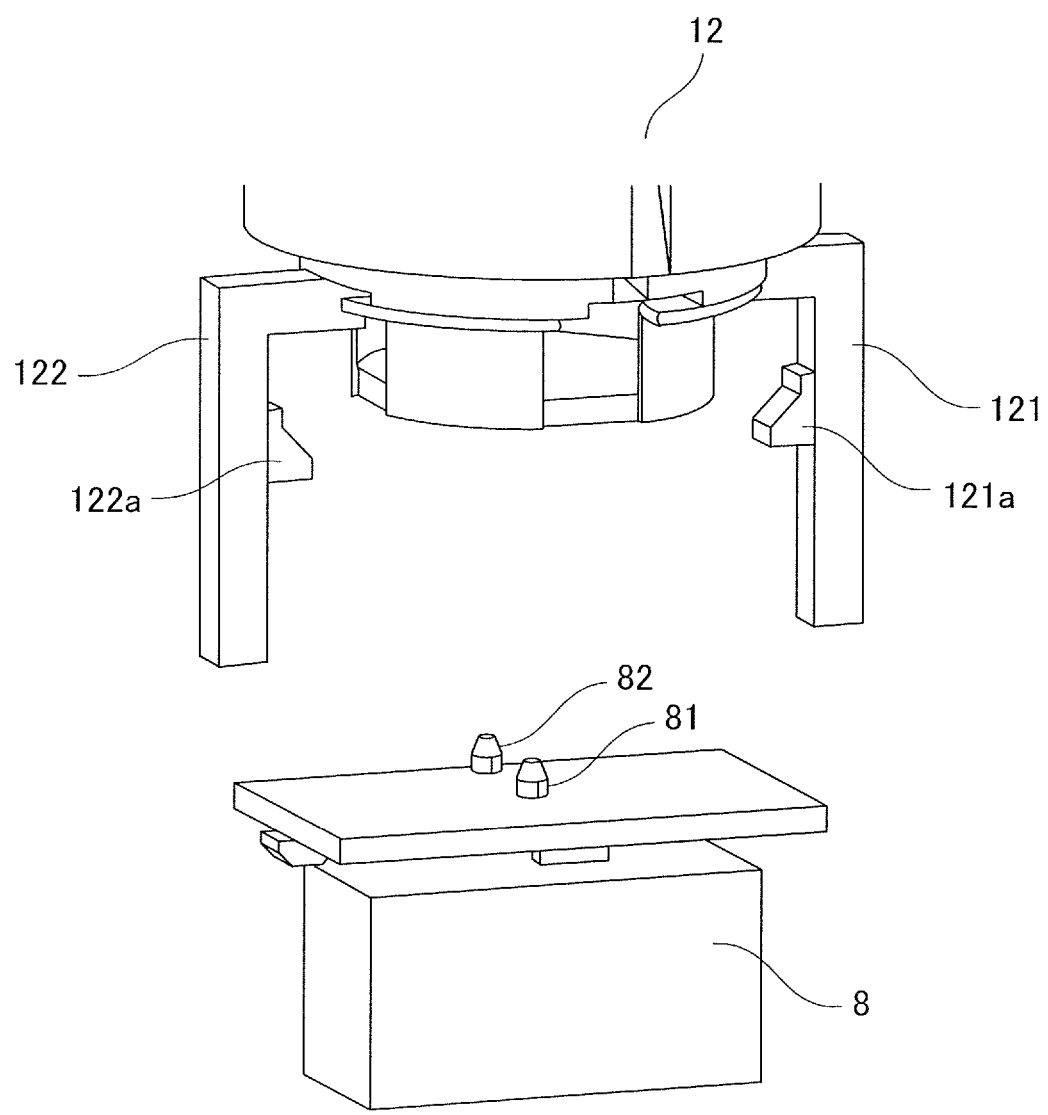
FIG. 6 is a diagram illustrating an attaching and detaching mechanism of the hand camera.

Here, the calibration between hand and camera will be described. As described above, the robot hand 12 is designed so as to be able to hold the hand camera 8. As illustrated in FIGS. 3 and 6, the two positioning pin holes 1231 and 1232 are formed in the palm unit 123 of the robot hand 12. In addition, the two pins 81 and 82 are formed on the bottom surface of the hand camera 8. Thus, when the pins 81 and 82 (FIG. 6) are fit in the pin holes 1231 and 1232 (FIG. 3), the robot hand 12 and the hand camera 8 are positioned accurately with respect to each other.

Figure 7:
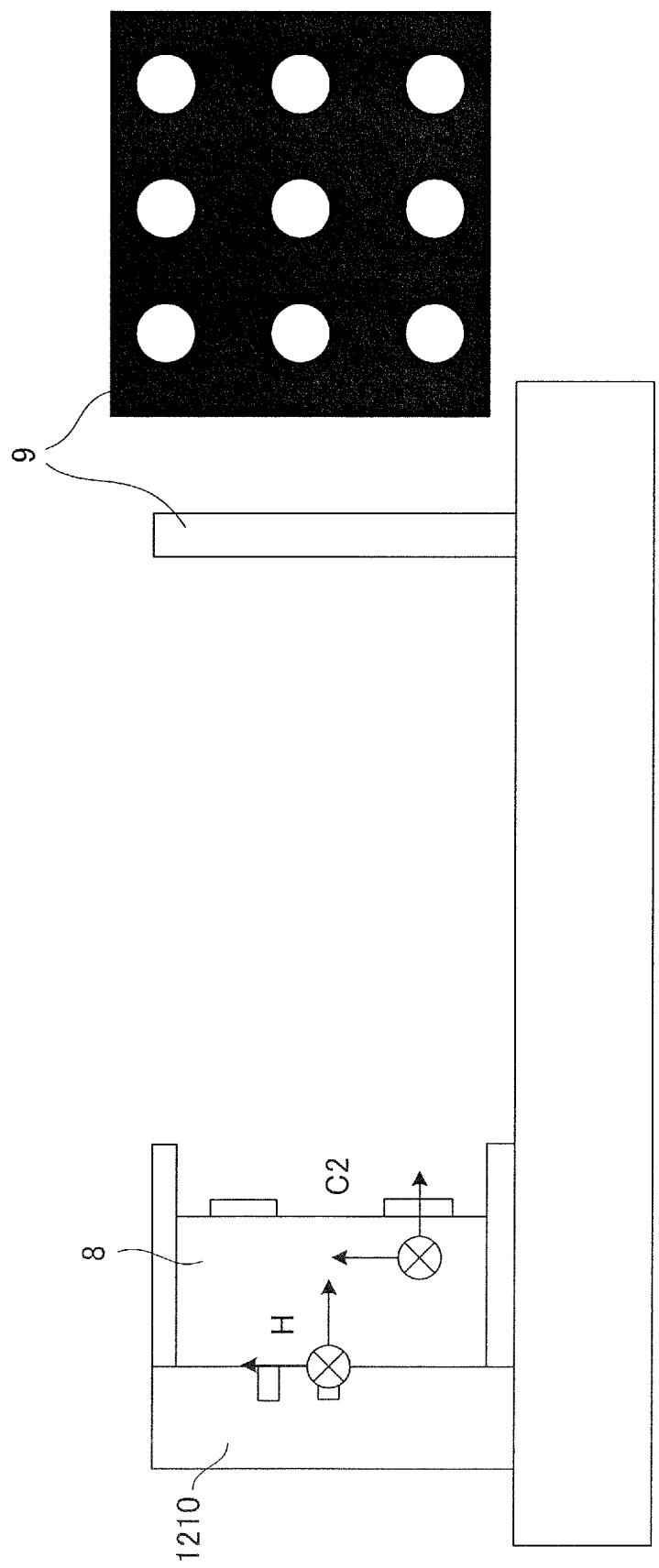
FIG. 7 is a diagram illustrating a configuration of a mechanism to calibrate the hand camera.

FIG. 7 is a diagram illustrating a hand-camera calibration device. As illustrated in FIG. 3, a hand coordinate system H that is set on the robot hand 12 is defined. For example, the origin of the hand coordinate system H may be set at the position of the pin hole 1231 of the robot hand 12. On the other hand, a coordinate system in which the hand camera 8 outputs positional data is defined as a hand camera coordinate system C2.

Thus, a three-dimensional position that the image processing device 7 determines by processing an image captured by the hand camera 8 is a position in the hand camera coordinate system C2. Here, for performing calibration between robot and marker, it is necessary to estimate the position of the robot hand 12 by using a three-dimensional position determined by the hand camera 8. For this reason, before the online operations, the calibration between hand and camera is performed to determine a transformation matrix $^{H}T_{C2}$ between hand and camera. The transformation matrix $^{H}T_{C2}$ indicates relative position and orientation between the hand coordinate system H and the hand camera coordinate system C2. The transformation matrix $^{H}T_{C2}$ between hand and camera corresponds to calibration data with which a coordinate value in the hand coordinate system H is transformed to a coordinate value in the hand camera coordinate system C2, and vice versa.

The hand-camera calibration device illustrated in FIG. 7 includes a hand mock 1210. In the hand mock 1210, pin holes having the same shape as that of the pin holes 1231 and 1232 of the palm unit 123 of the robot hand 12 are formed.

In addition, the hand-camera calibration device of FIG. 7 includes a calibration marker jig 9 at a position positioned accurately with respect to the hand mock 1210. The calibration marker jig 9 has a black surface, and on which a plurality of white circles are formed. The white circles are indexes that can be measured by the hand camera 8. Each of the indexes is mechanically accurately positioned within a required precision range in the hand coordinate system H. Here, although the calibration marker jig 9 has the polka-dot pattern, as an example, in which the white circles are formed on the black surface, the calibration marker jig 9 may have another pattern.

An image of the indexes of the calibration marker jig 9 is captured by the hand camera 8; and by using the image, the positions of the indexes in the hand camera coordinate system C2 can be determined. That is, by using the positions of the indexes in the hand coordinate system H and the determined positions of the indexes in the hand camera coordinate system C2, and by performing an optimizing calculation, the transformation matrix $^{H}T_{C2}$ between hand and camera can be determined. The hand-camera calibration device of FIG. 7 can accurately determine the transformation matrix $^{H}T_{C2}$ between hand and camera, because the hand-camera calibration device directly performs the measurement without the robot system interposed.

Figure 5:
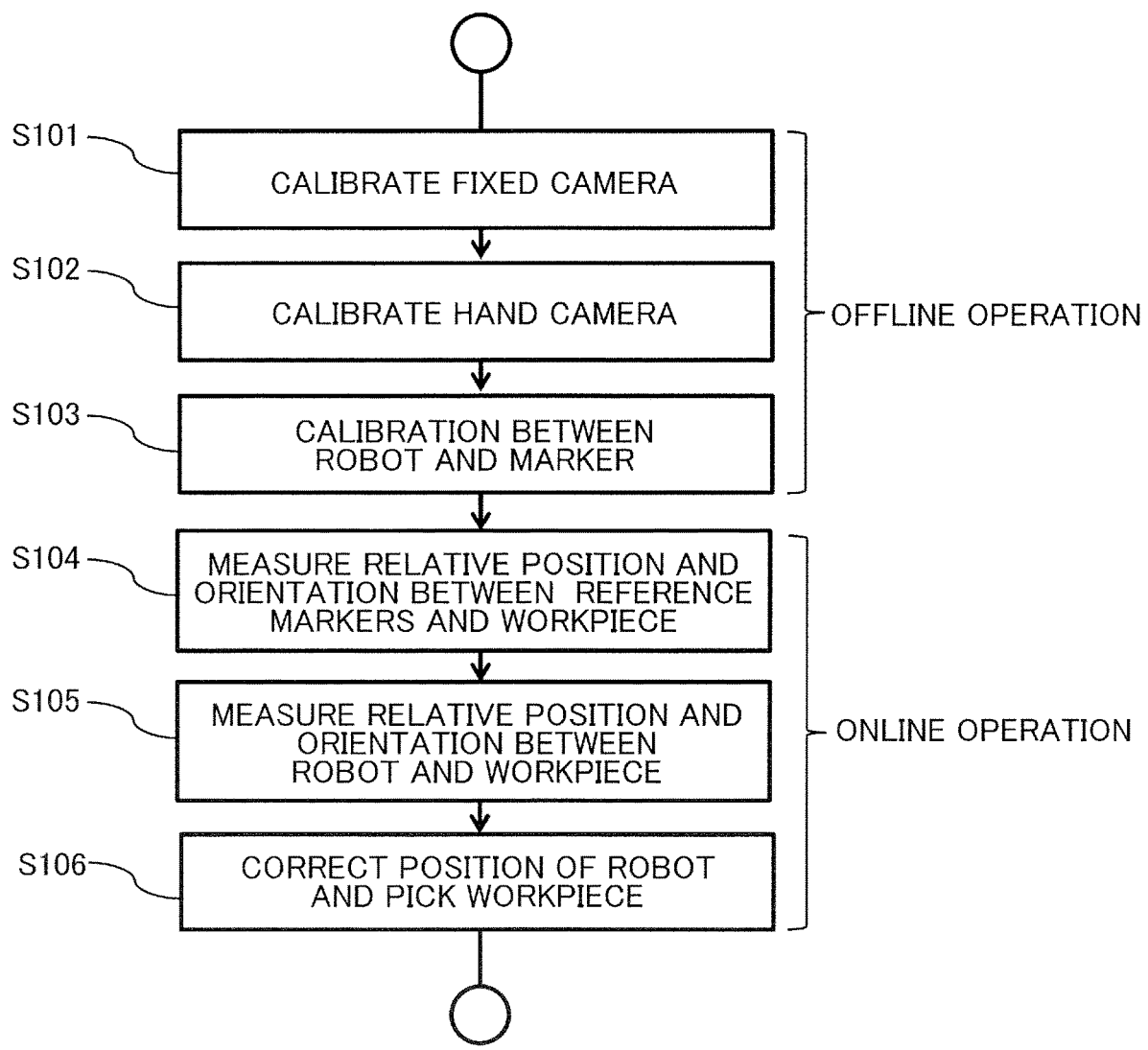
FIG. 5 is a flowchart illustrating the whole of robot control procedures.

In FIG. 5, after the calibration (S102) of the hand camera 8, the calibration between robot and marker is performed (S103). In the calibration between robot and marker, the calibration between the robot coordinate system R of the robot arm 11 and the marker coordinate system M of the reference markers 41 to 44 is performed via the hand camera 8. Specifically, calibration data used to perform coordinate transformation between the robot coordinate system R and the marker coordinate system M is obtained through calculation.

Figure 8:
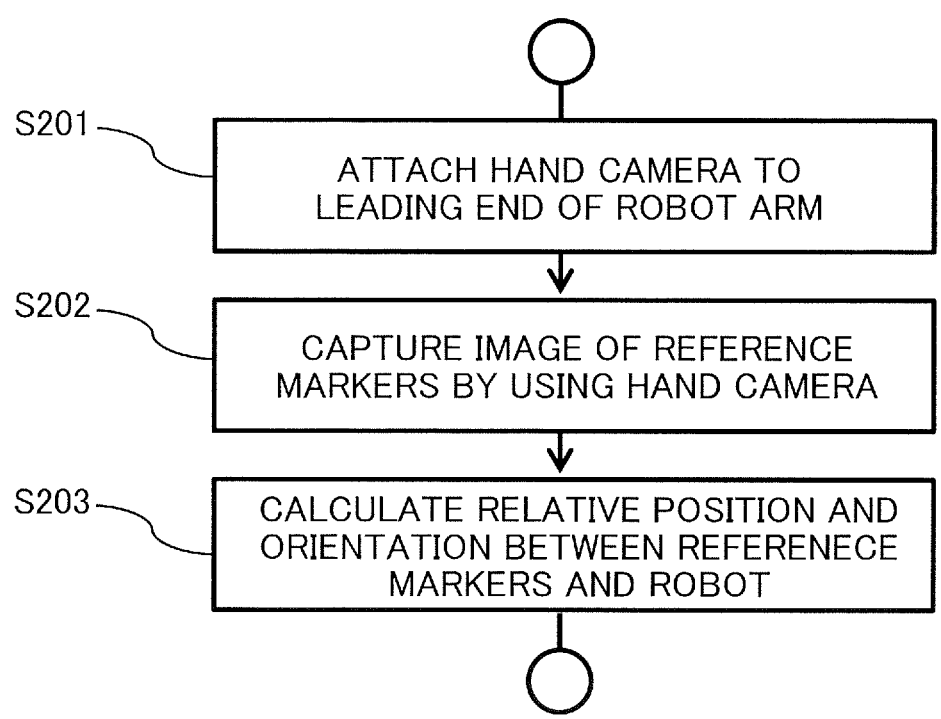
FIG. 8 is a flowchart illustrating calibration between the robot hand and markers.

For example, the calibration between robot and marker (S103) is performed as illustrated in FIG. 8. In FIG. 8, the hand camera 8 is first held by the robot hand 12, and thereby the hand camera 8 is attached to the robot hand 12 (S201). Then, by using a teaching pendant (not illustrated) connected to the robot control device 6, the robot arm 11 is moved to a position at which the hand camera 8 can capture an image of the reference markers 41 to 44. Typically, the robot arm 11 is controlled manually by a user by using the teaching pendant. However, the hand camera 8 may be moved to the position, at which the hand camera 8 can capture an image of the reference markers 41 to 44, and may capture an image of the reference markers 41 to 44, automatically by a control program that is prepared in advance.

Then an imaging command is sent from the image processing device 7 to the hand camera 8. Upon receiving the imaging command, the hand camera 8 captures an image of the reference markers 41 to 44, and sends the captured image to the image processing device 7 (S202).

Then the image processing device 7 calculates relative position and orientation between the reference markers 41 to 44 and the robot arm 11 (S203). Specifically, upon receiving the captured image, the image processing device 7 causes the image processing unit 712 to calculate the positions of the reference markers 41 to 44 in the coordinate systems $S_l$ and $S_r$ (FIG. 4) of the captured image.

Then the image processing device 7 reads the internal and external parameters of the hand camera 8 stored in the ROM 72, and performs stereo measurement. In the stereo measurement, the image processing device 7 uses the principle of triangulation, and transforms the positions of the reference markers 41 to 44 in the coordinate systems $S_l$ and $S_r$, into three-dimensional positions in a left-camera coordinate system $C_l$. Here, for convenience, the hand camera coordinate system C2 is equivalent to the left-camera coordinate system $C_l$ (FIG. 4). For example, when a parallel stereo camera is used, X, Y, and Z coordinates of a measured point $P_l$ are expressed by using the following equations.

$$X = \frac{B(x_l + x_r)}{2d}, Y = \frac{By}{d}, Z = \frac{Bf}{d}$$

In the above equations, a parameter f is a focal length, a parameter B is a baseline length that is a distance between principal points of lenses of the monocular cameras, a parameter d is a parallax that is the difference between X positions $x_l$ and $x_r$ of a feature point of images captured by the monocular cameras, and a parameter y is a Y position of the feature point of the images captured by the monocular cameras. The parameter f is determined from the internal parameters, and the parameter B is determined from the external parameters. In addition, positions of the reference markers 41 to 44 are indicated by symbols $P_i$ (i=1 to 4). For example, when i=1, the symbol $P_l$ indicates the position of the reference marker 41.

Then, a coordinate value of a reference marker $^{C2}p_i$ in the hand camera coordinate system C2 is transformed to a coordinate value in the robot coordinate system R, by using the transformation matrix $^{H}T_{C2}$ between hand and camera and the transformation matrix $^{R}T_{H}$ between the hand coordinate system H and the robot coordinate system R, and by using the following equation. The transformation matrix $^{R}T_{H}$ between the hand coordinate system H and the robot coordinate system R is a matrix determined from a mechanical geometry of the robot 1, and stored in the ROM 62 of the robot control device 6.

$$^{R}p_i = {}^{R}T_H {}^{H}T_{C2} {}^{C2}p_i$$

The above-described processing is also performed on the other reference markers 42 to 44. With this operation, coordinate values $^{R}p_i$ (i=1 to 4) of the reference markers in the robot coordinate system R can be obtained.

In addition, since the relative position and orientation between the reference markers are mechanically determined as described above, coordinate values $^M p_i$ (i=1 to 4) of the reference markers in the marker coordinate system M can also be obtained. Here, there is the following relationship between the transformation matrix $^R T_M$, determined in the calibration between robot and marker, and the calculated coordinate values of the reference markers.

$$^R p_i = {^R T_M} {^M p_i}$$

Then, nonlinear optimizing calculation can be performed for the homogeneous coordinate-transformation matrix $^R T_M$ so that the sum of squares of norm of the difference between the right side and the left side of the above equation becomes closer to zero, as expressed by the following expression. In the following expression, a parameter N indicates the number of reference markers.

$$\min_{^R T_M} \sum_{i=1}^{N} \| {^R p_i} - {^R T_M^M p_i} \|^2$$

The transformation matrix $^R T_M$ between robot and marker, calculated as described above, is stored in the ROM 72 or the RAM 73 of the image processing device 7. After that, the hand camera 8 is removed from the robot hand 12. With this operation, the offline operations (S101 to S103) illustrated in FIG. 5 are completed. Then, the online operations (S104 to S106) will be performed. Here, the description of the online operations will be made, as an example, for the control performed after the workpiece 51 is supplied from the stocker 3.

First, the measurement (S104) of relative position and orientation between the reference markers and the workpiece will be described. The image processing device 7 transmits an imaging command to the fixed camera 2. In this time, the workpiece 51 and the reference markers 41 to 44 are within the field of view of the fixed camera 2. In addition, when the fixed camera 2 captures an image, the position of the robot arm 11 is controlled by the robot control device 6 so that the objects, an image of which is to be captured by the fixed camera 2, are not covered with the robot arm 11.

The fixed camera 2 captures an image of the workpiece 51 and the reference markers 41 to 44, and transmits the image to the image processing device 7. The image processing device 7 receives the captured image, and causes the image processing unit 712 to measure the position and the orientation of the workpiece 51 and the positions of the reference markers 41 to 44 from the captured image. The position and the orientation of the workpiece 51 can be determined by stereo-measuring three or more feature portions of the workpiece 51. Here, as illustrated in FIG. 2, the position and the orientation of the workpiece 51 is indicated in a workpiece coordinate system W. Thus, calibration data used to perform coordinate transformation between the workpiece coordinate system W and the fixed-camera coordinate system C can be determined as a transformation matrix $^C T_W$.

If there is positional information on the reference markers 41 to 44 in the fixed-camera coordinate system C, the transformation matrix $^C T_M$ between the marker coordinate system M and the fixed-camera coordinate system C can also be determined. Thus, by using the transformation matrix $^C T_W$ between the workpiece coordinate system W and the fixed-camera coordinate system C and the transformation matrix $^C T_M$ between the marker coordinate system M and the fixed-camera coordinate system C, and by using the following equation, the transformation matrix $^M T_W$ between the reference markers 41 to 44 and the workpiece 51 can be calculated.

$$^M T_W = (^C T_M)^{-1} {^C T_W}$$

Then, relative position and orientation between the robot and the workpiece are determined (S105). The relative position and orientation $^R T_W$ between the robot and the workpiece are expressed as the following expression by using the transformation matrix $^R T_M$ between the robot and the reference markers, stored in the ROM 72 of the image processing device 7, and the transformation matrix $^M T_W$ between the reference markers and the workpiece, calculated from the image captured by the fixed camera 2.

$$^R T_W = {^R T_M} {^M T_W}$$

Then, by using the relative position and orientation $^R T_W$ between the robot and the workpiece, the position of the robot is corrected to pick the workpiece (S106). Here, before the position and the orientation of the robot hand 12 are corrected, an original position and orientation of the robot hand 12 has been determined in advance for the robot hand 12 to pick the workpiece 51. A hand coordinate system determined before the position and the orientation of the robot hand 12 are corrected is indicated by a symbol $H_2$. Thus, the relative position and orientation between the hand coordinate system $H_2$ and the workpiece coordinate system W are expressed by a transformation matrix $^{H2} T_W$. The value of the transformation matrix $^{H2} T_W$ may be stored in the ROM 62 of the robot control device 6. In addition, current position and orientation of the robot hand 12 in the robot coordinate system R are expressed by a transformation matrix $^R T_{Hn}$. The symbol Hn indicates a hand coordinate system determined from the current position of the robot hand 12. Thus, by using these transformation matrixes and the following equation, a correction amount $^{Hn} T_{H2}$ for the robot hand 12 is calculated.

$$^{Hn} T_{H2} = (^R T_{Hn})^{-1} {^R T_W} (^{H2} T_W)^{-1}$$

Thus, the robot control device 6 corrects the position and the orientation of the robot arm 11 so that the robot hand 12 moves by the correction amount $^{Hn} T_{H2}$. After the robot arm 11 moves to a desired position, the robot control device 6 causes the fingers of the robot hand 12 to close for holding the workpiece 51.

As described above, in the present embodiment, the reference markers disposed at positions fixed to the stand 4 of the robot 1 are measured by the hand camera 8 (three-dimensional measuring or imaging device) attached to the robot arm 11. With this measurement, the calibration data used to perform the coordinate transformation between the marker coordinate system M and the robot coordinate system R can be obtained with high accuracy. Then, by using the calibration data and the image captured by the fixed camera 2, the position and the orientation of the workpiece 51 in the robot coordinate system R can be obtained with high accuracy. In the present embodiment, even when the fixed camera 2 vibrates or deforms, coordinate calculations are performed via the marker coordinate system M that has been accurately calibrated in the relationship between the marker coordinate system M and the robot coordinate system R. Thus, even in the simple and inexpensive configuration in which the camera stand for the fixed camera 2 is fixed to the conveyance device for the workpiece, the robot can be controlled with high accuracy, without affected by the vibration or deformation of the fixed camera 2.

Second Embodiment

A second embodiment differs from the first embodiment in shape and arrangement of the reference markers. Since the configuration other than that of the reference markers and the control method may be the same as those in the first embodiment, the duplicated description thereof will be omitted in the following description. In addition, a component identical to or equivalent with a component of the first embodiment will be given an identical reference symbol, and the detailed description thereof will be omitted.

Figure 9:
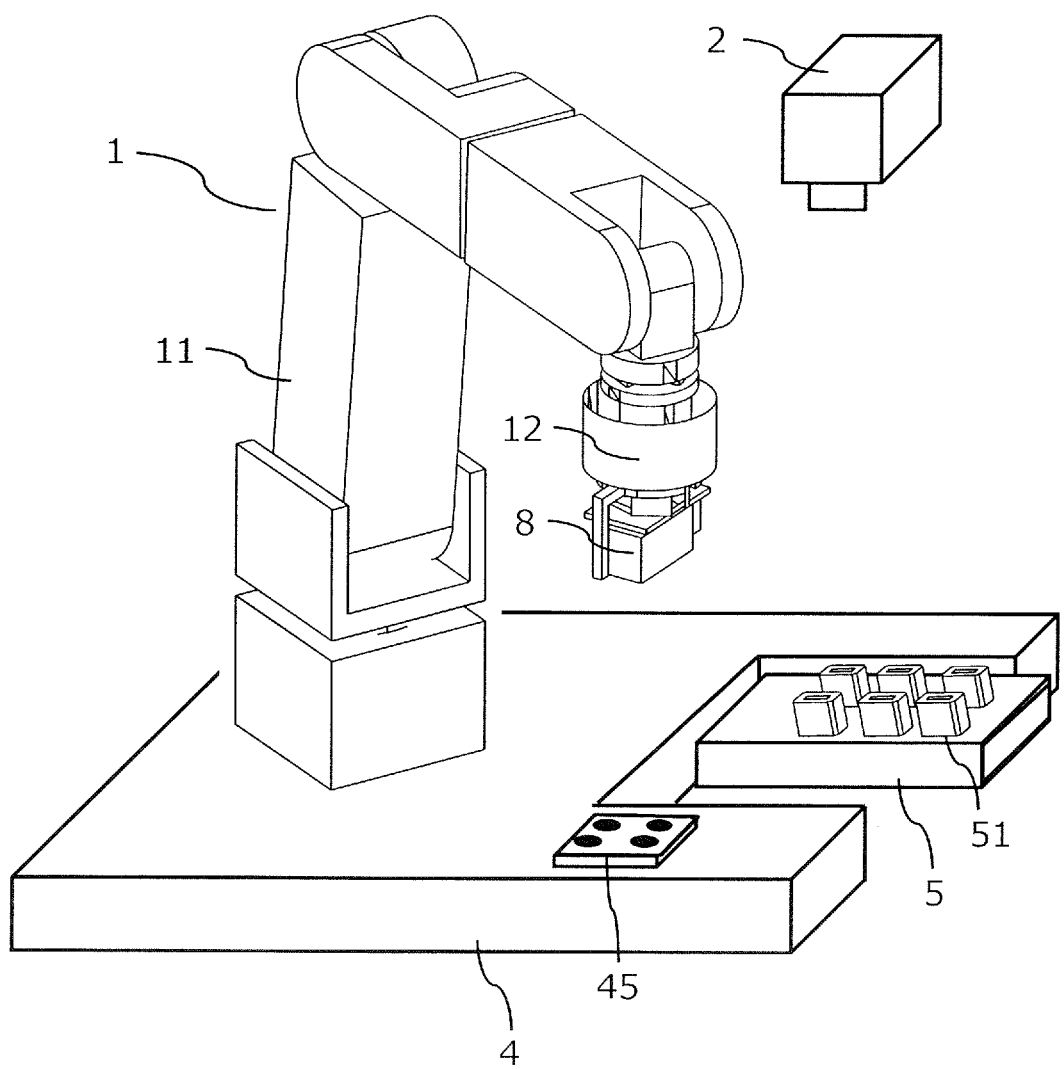
FIG. 9 is a diagram illustrating a configuration of reference markers of the second embodiment.

FIG. 9 illustrates a reference marker plate 45 of the present embodiment. In FIG. 9, the reference marker plate 45 is placed on the stand 4. Here, FIG. 9 illustrates an installation position of the fixed camera 2, but does not illustrate the supporting portions for the imaging device, including the camera stand.

As illustrated by black circles of FIG. 9, the reference marker plate 45 is provided with four indexes (markers) whose positions can be accurately measured by the camera. Here, although the four indexes (markers) are formed on the reference marker plate 45 in the present embodiment, at least three indexes (markers) may be formed on the reference marker plate 45 to perform three-dimensional measurement by using the hand camera 8. The reference marker plate 45 is disposed within the field of view of the fixed camera 2, and within a range in which the robot arm 11 can move. In FIG. 9, the reference marker plate 45 is placed on a portion of the stand 4 beside an area that the tray 5 enters.

The indexes of the reference marker plate 45 are disposed such that all the indexes are within the field of view of the hand camera 8. Thus, for causing the hand camera 8 to capture an image of the reference marker plate 45 (S202) for performing the calibration between robot and marker (S103) in the procedures of FIGS. 5 and 8, the robot arm 11 has only to move to a position directly above the reference marker plate 45. With this operation, a work time required for a user to capture the image can be reduced in the calibration between robot and marker (S103). In addition, since the indexes (markers) are formed on the reference marker plate 45, the relative position and orientation between the markers can be easily obtained with high accuracy. With this formation of the markers, the marker coordinate system M can be defined with high accuracy.

Figure 10:
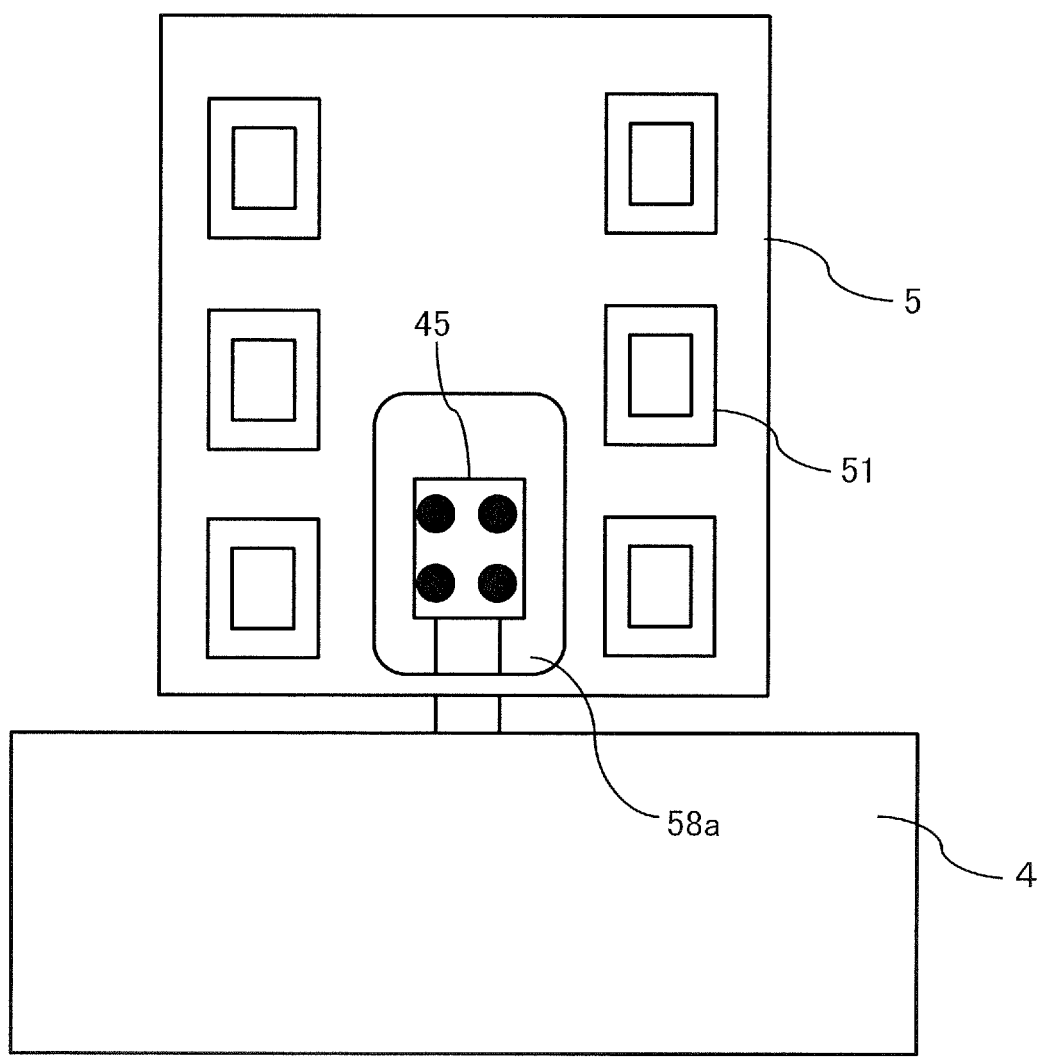
FIG. 10 is a diagram illustrating another configuration of the reference markers of the second embodiment.

In FIG. 9, the position of the reference marker plate 45 is deviated from the center of the tray 5. Here, there may be a case in which the optical axis of the fixed camera 2 is preferably aligned with the center of the tray 5. In addition, there may be a case in which an image of the reference marker plate 45 is captured by the fixed camera 2, preferably in a center portion (in which the image will be captured with high accuracy) of the field of view of the fixed camera 2, rather than in a peripheral portion of the field of view. For these cases, as illustrated in FIG. 10, the reference marker plate 45 may be disposed under the tray 5, and an opening 58a may be formed in a portion of the tray 5 on which the workpiece 51 is not placed. In this case, the reference marker plate 45 may be supported by a supporting arm extending from the stand 4, or by a floor on which the stand 4 is placed. With such a configuration, the workpiece 51 and the reference marker plate 45 can be positioned at or near the center of the field of view of the fixed camera 2. In general, in most optical systems for capturing images, measurement accuracy tends to decrease in a peripheral portion of the field of view, because of lens distortion. In the configuration of FIG. 10, however, since the reference marker plate 45 can be disposed at or near the center of the field of view, the relative position and orientation between the reference markers and the workpiece can be measured with high accuracy (S104).

Third Embodiment

In the first and the second embodiments, the hand camera 8 is used as a three-dimensional measuring device that is used to perform the calibration between the marker coordinate system and the robot coordinate system. However, the reference markers disposed at positions fixed to the stand 4 of the robot 1 may not necessarily be detected by using image information. That is, the three-dimensional measuring device necessary for the calibration between the marker coordinate system and the robot coordinate system may be a device other than the three-dimensional imaging device. Hereinafter, the description will be made for a case where a probe measurement device is used as the three-dimensional measuring device. The probe measurement device measures a shape and positions of hemispherical markers. Also in the present embodiment, a component identical to or equivalent with a component of the first and the second embodiments will be given an identical reference symbol, and the detailed description thereof will be omitted.

Figure 11:
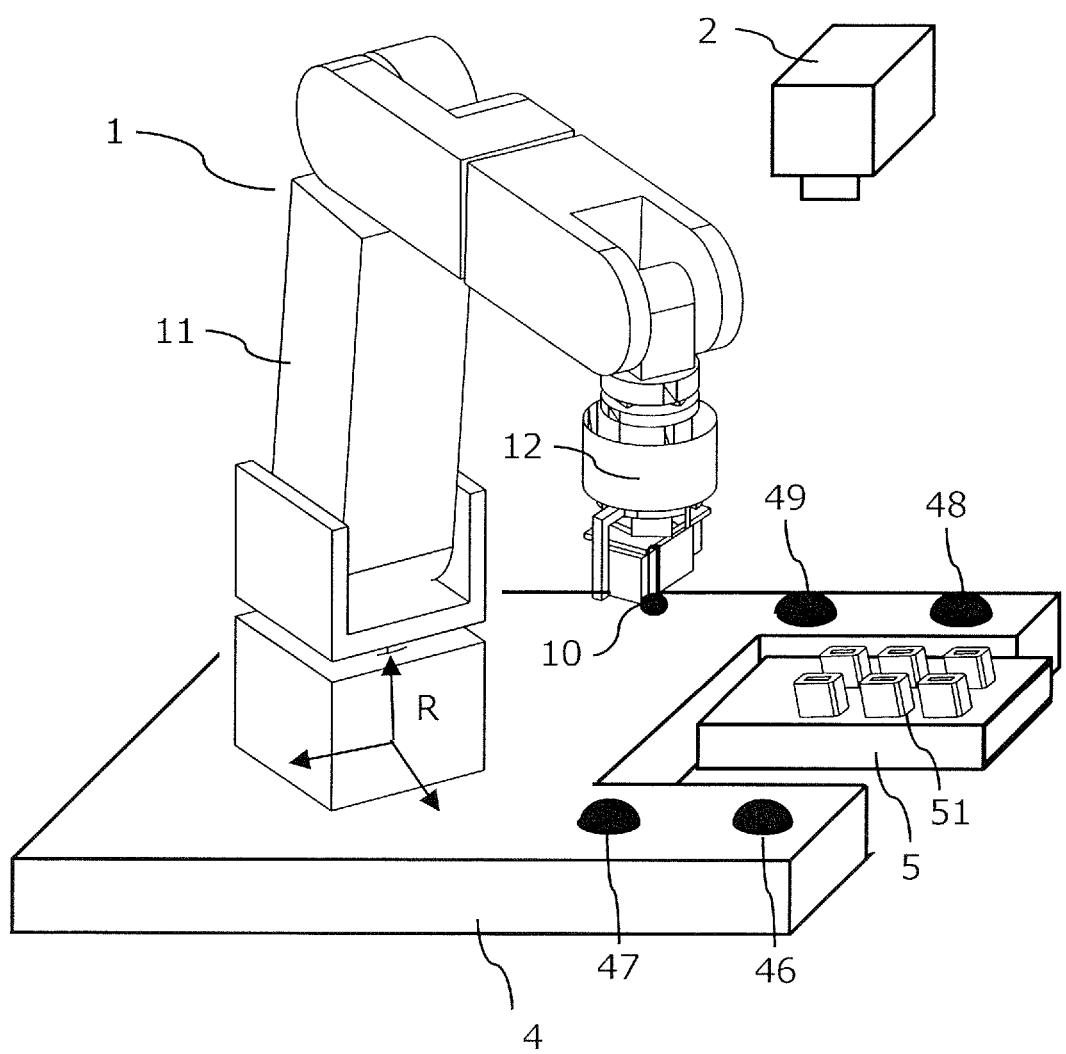
FIG. 11 is a diagram illustrating a configuration of reference markers that can be measured with a probe of the third embodiment.
Figure 12:
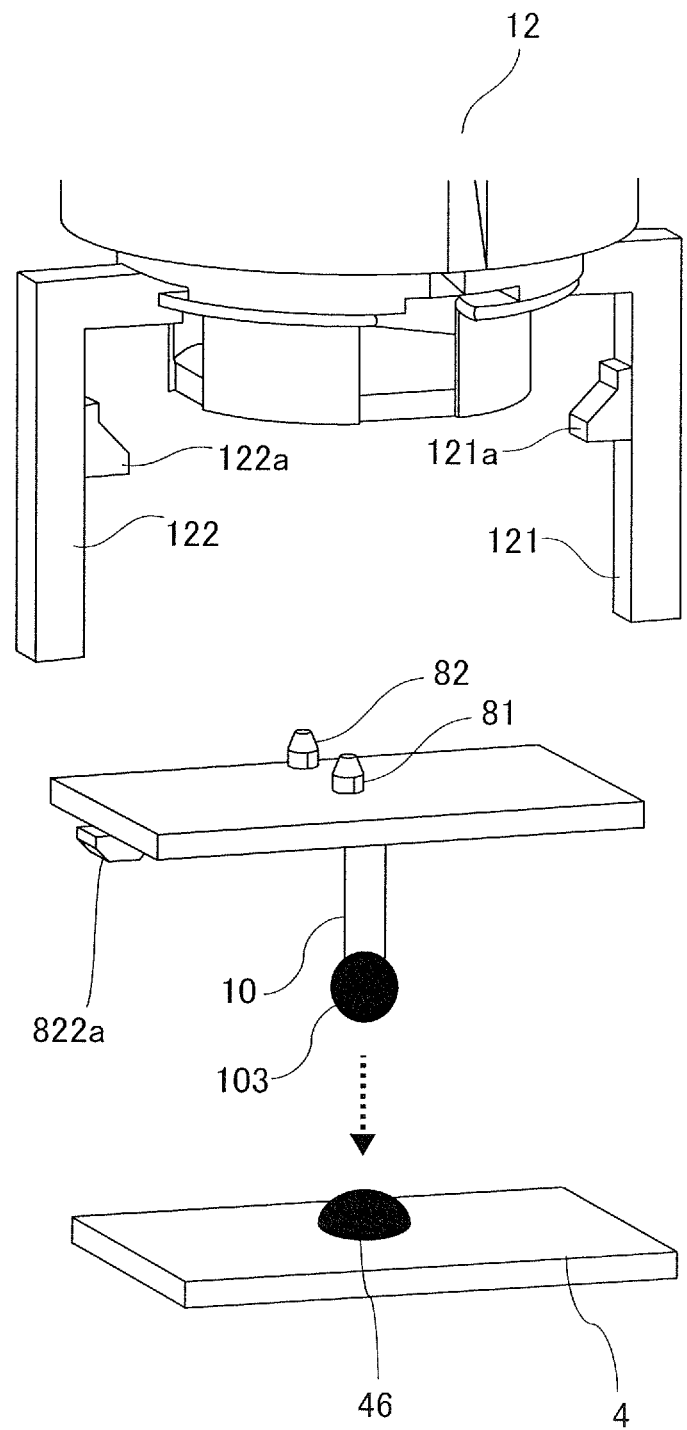
FIG. 12 is a diagram illustrating the robot hand and the probe.

FIG. 11 illustrates a configuration of main components of a third embodiment, necessary for performing the calibration between the robot coordinate system and the marker coordinate system. FIG. 11 differs from FIG. 1 in that not the hand camera 8 but a probe jig 10 is attached to the robot hand 12 of the robot 1. FIG. 12 illustrates a configuration of main components of the probe jig 10 and the robot hand 12. As illustrated in FIG. 12, a spherical probe 103 is formed at the leading end of the probe jig 10.

The base of the probe jig 10 of FIG. 12 is joined with the joining mechanism of the robot hand 12 in the same way as the base of the hand camera 8 of FIG. 3 is joined with the joining mechanism of the robot hand 12. On the upper surface of the base of the probe jig 10, the two pins 81 and 82 are formed. Thus, if the robot hand 12 is structured as illustrated in FIG. 3A, the robot hand 12 and the probe jig 10 are accurately positioned with respect to each other when the pins 81 and 82 are inserted to the pin holes 1231 and 1232. In addition, the configuration and operation of the guide hooks 821a (not illustrated) and 822a, which engage with the guide hooks 121a and 122a of the fingers 121 and 122, are the same as those of the first embodiment.

The relative positional relationship between the pins 81 and 82 and the probe 103 is accurately set within a required precision range. For this purpose, the machining accuracy for the probe jig 10 is controlled.

Figure 15:
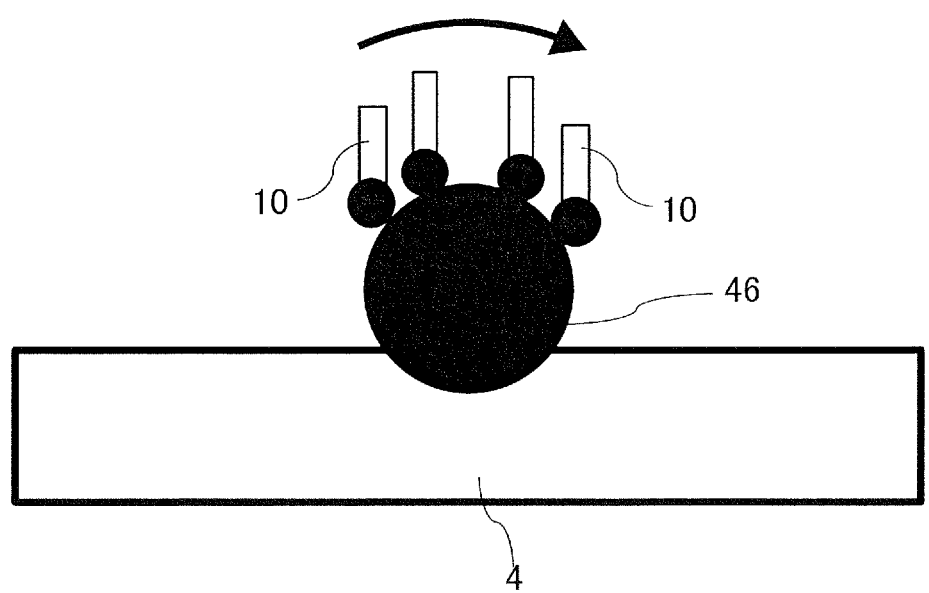
FIG. 15 is a diagram illustrating a reference marker that is being measured with the probe.

In a case where the position of the probe 103 is calibrated in advance, the calibration may be performed as below. First, a reference ball 46 whose sphericity is known is fixed to the stand 4 (FIGS. 12 and 15). Then, contact measurement is performed on a plurality of portions of the surface of the reference ball 46 (FIG. 15). The results of the measurement are compared with design values of the reference ball 46, and thereby a coordinate value of the probe 103 in the hand coordinate system H can be calculated. In this manner, when the probe jig 10 is attached to the robot hand 12, the position of the probe 103 in the hand coordinate system H (coordinate system for the attaching and detaching mechanism) can be calculated with high accuracy.

Here, although the configuration of the robot control device 6 is not illustrated in FIG. 11, the robot control device 6 may have the same configuration as that of FIG. 1. In addition, in the present embodiment, the image processing device 7 illustrated in FIG. 1 processes an image captured by the fixed camera 2, and the processing for the probe jig 10, that is, the calibration between the marker coordinate system and the robot coordinate system is performed by the robot control device 6.

In this case, the robot hand 12 is provided with a force sensor (not illustrated). The force sensor may detect reaction force applied on the fingers 121 and 122 that are holding the probe jig 10. With the force sensor (not illustrated), a moment at which the probe 103 contacts a reference marker can be detected. The force sensor having the same function may be mounted not in the robot hand 12, but in the probe jig 10 or the robot arm 11.

A second difference between the third embodiment and the first or the second embodiment is the shape of the markers, which are, in the third embodiment, the reference balls 46 to 49 corresponding to the reference markers 41 to 44. In the present embodiment, the reference balls 46 to 49 are spheres. The spherical shape of the reference balls 46 to 49 allows the reference balls 46 to 49 to be measured with high accuracy when the positions of the reference balls (markers) 46 to 49 are measured by causing the probe 103 to contact the reference balls 46 to 49, and when the positions of the reference balls (markers) 46 to 49 are measured by causing the fixed camera 2 to capture an image of the reference balls 46 to 49. However, the shape of the reference balls 46 to 49 may not be spherical. For example, as long as the reference balls 46 to 49 can be measured with high accuracy through a contact or noncontact three-dimensional measurement, the reference balls 46 to 49 may have any three-dimensional shape, such as a cylindrical shape, a conical shape, or a simple boss-hole shape.

Figure 13:
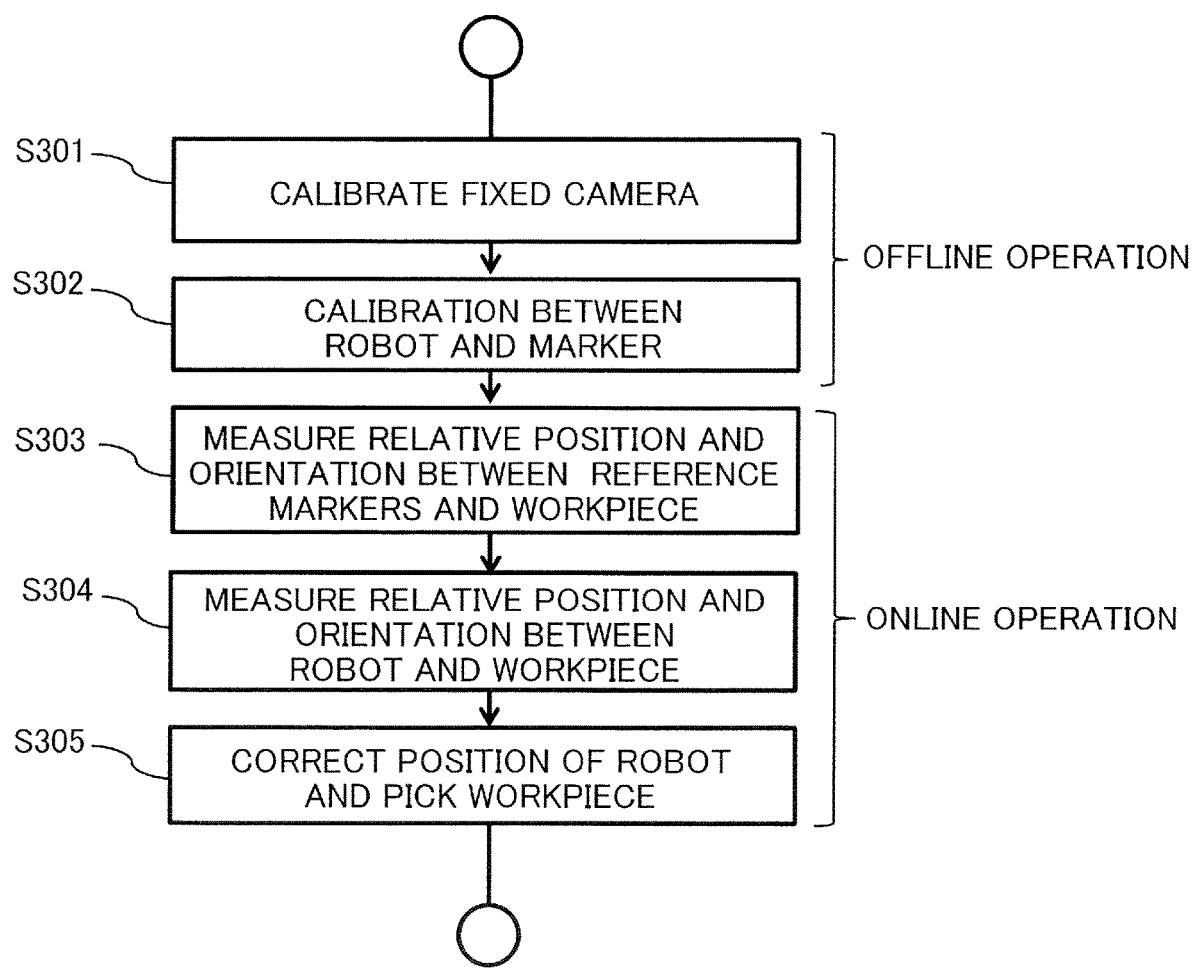
FIG. 13 is a flowchart illustrating the whole of robot control procedures of the third embodiment.
Figure 14:
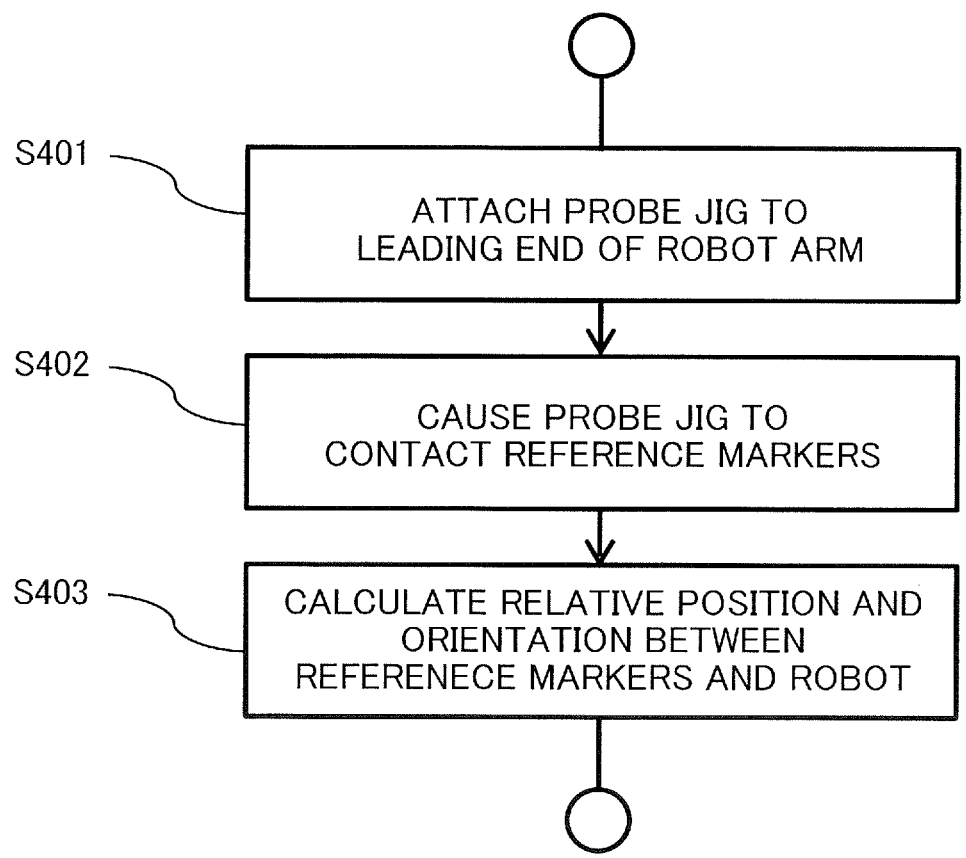
FIG. 14 is a flowchart illustrating calibration between the robot hand and the markers.

FIGS. 13 and 14 are flowcharts corresponding to FIGS. 5 and 8, and illustrate procedures of controlling the position and the orientation of the robot 1 of the present embodiment. In FIG. 14, a digit, 4, is used in the hundreds place of step numbers in place of a digit, 2, of FIG. 8. In addition, if a digit in the ones place of a step number of FIG. 8 is equal to a digit in the ones place of a step number of FIG. 14, the process in the step number of FIG. 8 is equal to the process in the step number of FIG. 14. The control procedures illustrated in FIGS. 13 and 14 may be stored in the ROM 72, as a control program executed by the CPU 71.

The processes in FIG. 13 differ from the processes in FIG. 5 of the first embodiment, in that the calibration of the hand camera (S102) is not performed in the offline operations (S301 and S302).

FIG. 14 specifically illustrates calibration between robot and marker (S302). In the calibration between robot and marker (S302), the reference balls 46 to 49 are measured by using the probe jig 10, and the calibration data used to perform the coordinate transformation between the robot coordinate system R of the robot arm 11 and the marker coordinate system M determined from the reference balls 46 to 49 is obtained.

In FIG. 14, the probe jig 10 is first attached to the leading end of the robot arm 11 (S401). In the present embodiment, the probe jig 10 is held by the robot hand 12. This operation may be performed by a user using a teaching pendant, or may be performed depending on a prepared control program.

Then the robot control device 6 (FIG. 1) controls the robot arm 11, causes the probe jig 10 to contact the reference balls 46 to 49 (S402), and thereby measures the position of each of the reference balls 46 to 49.

FIG. 15 illustrates the probe jig 10 performing the contact measurement on the reference ball 46. As illustrated in FIG. 15, the probe 103 contacts four or more portions of the reference ball 46, and measures a position of the probe 103 when the probe 103 contacts any one of the portions of the reference ball 46. The results of the measurement are fitted with the equation of the sphere, and a center position and a radius of the measurement results by the probe 103 are determined. The same contact measurement is performed on all of the reference balls 46 to 49. With this operation, center coordinate values $Rp_i$ (i=1 to 4) of the reference balls 46 to 49 in the robot coordinate system R can be obtained. This process corresponds to the process in which the center coordinate values of the reference markers 41 to 44 in the robot coordinate system R are determined from the image captured by the hand camera 8 in the first and the second embodiments.

In FIG. 14, the process (S403) to calculate the relative position and orientation between the reference balls 46 to 49 and the robot is the same as the process (S203) of FIG. 8 of the first embodiment. In the process (S403), the calibration data used to perform the coordinate transformation between the marker coordinate system M and the robot coordinate system R is obtained.

In FIG. 13, the online operations (S303 to S305) are the same as the online operations (S104 to S106) of FIG. 5. In the online operations (S303 to S305), an image of the workpiece 51 and the reference balls 46 to 49 is captured by the fixed camera 2, and the position and the orientation of the workpiece 51 in the marker coordinate system M are obtained (S303). After that, the coordinate transformation between the marker coordinate system M and the robot coordinate system R is performed, then the position of the workpiece 51 in the robot coordinate system R is obtained (S304), and then the position and the orientation of the robot arm 11 is corrected to perform a predetermined robot operation.

As described above, in the present embodiment, the three-dimensional (spherical) objects that can be measured by using the probe are used as the reference markers, which are disposed at positions fixed to the stand 4 of the robot 1. The probe is attached to the robot arm 11, as a three-dimensional measuring device. Even with such a configuration, the calibration data used to perform the coordinate transformation between the marker coordinate system M and the robot coordinate system R can be obtained with high accuracy, as in the first and the second embodiments. Then, by using the calibration data and the image captured by the fixed camera 2, the position and the orientation of the workpiece in the robot coordinate system R can be obtained with high accuracy. In the present embodiment, even when the fixed camera 2 vibrates or deforms, coordinate calculations are performed via the marker coordinate system M that has been accurately calibrated in the relationship between the marker coordinate system M and the robot coordinate system R. Thus, even in the simple and inexpensive configuration in which the camera stand for the fixed camera 2 is fixed to the conveyance device for the workpiece, the robot can be controlled with high accuracy, without affected by the vibration or deformation of the fixed camera 2.

As described above, in the present embodiment, the spherical objects that can be measured by using the probe are used as the reference markers, which are disposed at positions fixed to the stand 4 of the robot 1. When the spherical reference markers are disposed on the stand 4, it is preferable that a maximum-outer-diameter portion of each sphere is above the upper surface of the stand 4. Specifically, each reference marker is preferably disposed such that an equator portion of the spherical body is above the upper surface of the stand 4, and exposed to the outside. With the reference markers disposed in this manner, when an image of the reference markers is captured by the fixed camera 2, the maximum-outer-diameter portion of each reference marker is always within the field of view of the fixed camera 2. Thus, when the edge of each spherical body is extracted through image processing, the edge of the maximum-outer-diameter portion of each reference marker can be always detected. In addition, by performing an ellipse fitting process on the edge of each reference marker, the center position of each spherical body can be measured with high accuracy. The reference balls 46 to 49 may be three-dimensionally measured by causing the fingers to directly contact the reference balls 46 to 49, instead of causing the probe jig 10 to contact the reference balls 46 to 49. In this case, there are advantages in which an error caused by causing the fingers 121 and 122 to hold the probe jig 10 can be reduced and the need of the probe jig 10 can be eliminated.

The present invention can also be achieved by providing a program, which performs one or more functions of the above-described embodiments, to a system or a device via a network or a storage medium, and by one or more processors, which are included in a computer of the system or the device, reading and executing the program. In addition, the present invention can also be achieved by using a circuit, such as an ASIC, which performs the one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-135334, filed Jul. 18, 2018, which is hereby incorporated by reference herein in its entirety.

What is claimed is:

1. A method of controlling a robot system, the method comprising:
    measuring, by using a first device, a position and an orientation of a marker with respect to a robot;
    measuring, by using a second device, a position and an orientation of a workpiece with respect to the marker;
    calculating a first relative positional relationship between the marker and the robot by using a result of the measuring by using the first device;
    calculating a second relative positional relationship between the marker and the workpiece by using a result of the measuring by using the second device;
    calculating a third relative positional relationship between the workpiece and the robot in accordance with the first relative positional relationship and the second relative positional relationship; and
    controlling the robot by using the third relative positional relationship,
    the method further comprising:
    defining a marker coordinate system by using the result of the measuring by using the first device; and
    calculating a position and an orientation of the workpiece in the marker coordinate system.

2. The method according to claim 1, wherein the controlling of the robot, comprises:
    correcting a position and an orientation of the robot; and
    picking, by the robot, the workpiece.

3. The method according to claim 1, wherein the first device is a three-dimensional imaging device configured to capture an image of the marker, or a probe measurement device configured to measure a position and a shape of the marker.

4. The method according to claim 1, wherein the second device is an imaging device configured to capture an image in which both of the marker and the workpiece are within a field of view of the imaging device.

5. The method according to claim 1, wherein the calculating of the third relative positional relationship, further comprises:
    calculating calibration data used to perform coordinate transformation between a robot coordinate system and the marker coordinate system, in accordance with the position and the orientation of the marker with respect to the robot, the position and the orientation of the marker being measured by the first device, the robot coordinate system being used to control the robot, the marker coordinate system being determined from the marker.

6. The method according to claim 5, wherein the calculating of the third relative positional relationship between the workpiece and the robot comprises:
    calculating a position and an orientation of the workpiece in the robot coordinate system, by using a following expression:

$${}^{R}T_W = {}^{R}T_M {}^{M}T_C {}^{C}T_W$$

where R is the robot coordinate system, C is a camera coordinate system of the second device, M is the marker coordinate system, W is a workpiece coordinate system determined from a position and an orientation of the workpiece, and ${}^{R}T_M$ is the calibration data used to perform the coordinate transformation between the robot coordinate system R and the marker coordinate system M.

7. The method according to claim 5, wherein the first device is a three-dimensional imaging device configured to capture an image of the marker, and wherein calculating the calibration data used to perform the coordinate transformation between the marker coordinate system and the robot coordinate system, by using a following expression:

$$^{R}T_{M} = {^{R}T_{C_2}} {^{C_2}T_{M}}$$

where $C_2$ is a camera coordinate system of the three-dimensional imaging device, R is the robot coordinate system, and $^{R}T_{M}$ is the calibration data used to perform the coordinate transformation between the marker coordinate system M and the robot coordinate system R.

8. The method according to claim 5, wherein the first device is a three-dimensional imaging device configured to capture an image of the marker,
wherein the three-dimensional imaging device is configured to be attached to the robot via an attaching and detaching mechanism, and
wherein calculating calibration data used to perform coordinate transformation between an attaching and detaching mechanism coordinate system determined from the attaching and detaching mechanism and a camera coordinate system of the three-dimensional imaging device, in state where the three-dimensional imaging device is fixed to a jig via the attaching and detaching mechanism.

9. The method according to claim 8, wherein calculating the calibration data used to perform the coordinate transformation between the marker coordinate system and the robot coordinate system, by using a following expression:

$$^{R}T_{M} = {^{R}T_{H}} {^{H}T_{C_2}} {^{C_2}T_{M}}$$

where $C_2$ is a camera coordinate system of the three-dimensional imaging device, R is the robot coordinate system, H is the attaching and detaching mechanism coordinate system, and $^{R}T_{M}$ is the calibration data used to perform the coordinate transformation between the marker coordinate system M and the robot coordinate system R.

10. The method according to claim 1, wherein the first device is attached to the robot placed on a stand, and
wherein the second device is supported by a base unit separated from the stand.

11. The method according to claim 10, wherein a conveyance device configured to convey the workpiece is supported by the base unit.

12. A non-transitory storage medium storing a control program that causes the robot system to perform the method of claim 1.

13. A control device for controlling a robot system, wherein the robot system comprises a marker and a robot to handle a workpiece,
wherein the control device is configured to obtain a first result of measuring a position and an orientation of the marker with respect to the robot;
wherein the control device is configured to obtain a second result of measuring a position and an orientation of the workpiece with respect to the marker;
wherein the control device is configured to calculate a first relative positional relationship between the marker and the robot, by using the first result,
wherein the control device is configured to calculate a second relative positional relationship between the marker and the workpiece, by using the second result,
wherein the control device is configured to calculate a third relative positional relationship between the workpiece and the robot in accordance with the first relative positional relationship and the second relative positional relationship,
wherein the control device is configured to control the robot by using the third relative positional relationship,
wherein the control device is configured to define a marker coordinate system by using the result of the measuring by using the first device, and
wherein the control device is calculate a position and an orientation of the workpiece in the marker coordinate system.

14. The control device according to claim 13, wherein the control device is configured to calculate a relative positional relationship between the marker and the workpiece by causing an imaging device to capture an image of the marker and the workpiece, and
wherein the control device is configured to calculate a relative positional relationship between the marker and the robot by causing a measuring device to measure position and orientation of the marker with respect to the robot.

15. The control device according to claim 14, wherein the measuring device is a three-dimensional imaging device configured to capture an image of the marker.

16. The control device according to claim 14, wherein the measuring device is a probe measurement device configured to measure position and a shape of the marker.

17. A robot system comprising: the control device according to claim 13; an imaging device; the marker; a measuring device; the robot; and
a supporting portion configured to support the imaging device and supported by a base unit,
wherein the base unit is separated from a stand on which the robot is placed.

18. A robot system comprising: the control device according to claim 13; an imaging device; the marker; a measuring device; the robot; and a conveyance device configured to convey the workpiece and supported by a base unit,
wherein the base unit is separated from a stand on which the robot is placed.

19. A method of making a product, comprising:
using a robot system comprising the control device according to claim 13;
causing the robot to hold the workpiece in accordance with a relative positional relationship between the workpiece and the robot; and
causing the workpiece which is held by the robot to contact another workpiece.

* * * * *